US012327541B2

(12) United States Patent
Fukui et al.

(10) Patent No.: US 12,327,541 B2
(45) Date of Patent: Jun. 10, 2025

(54) SOUND SYSTEM

(71) Applicant: NIPPON TELEGRAPH AND TELEPHONE CORPORATION, Tokyo (JP)

(72) Inventors: Masahiro Fukui, Tokyo (JP); Kazunori Kobayashi, Tokyo (JP); Noriyoshi Kamado, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 236 days.

(21) Appl. No.: 18/031,135

(22) PCT Filed: Oct. 28, 2020

(86) PCT No.: PCT/JP2020/040453
§ 371 (c)(1),
(2) Date: Apr. 10, 2023

(87) PCT Pub. No.: WO2022/091255
PCT Pub. Date: May 5, 2022

(65) Prior Publication Data
US 2023/0377550 A1 Nov. 23, 2023

(51) Int. Cl.
*G10K 11/178* (2006.01)

(52) U.S. Cl.
CPC .. *G10K 11/17823* (2018.01); *G10K 11/17881* (2018.01); *G10K 11/17825* (2018.01);
(Continued)

(58) Field of Classification Search
CPC ........... G10K 11/178; G10K 11/17813; G10K 11/17823; G10K 11/1787;
(Continued)

(56) References Cited

U.S. PATENT DOCUMENTS

| | | | |
|---|---|---|---|
| 8,509,452 | B2 | 8/2013 | Yokota |
| 2006/0056650 | A1 | 3/2006 | Hofmann et al. |

(Continued)

FOREIGN PATENT DOCUMENTS

| | | | |
|---|---|---|---|
| JP | 2005003777 | A | 1/2005 |
| JP | 2006508573 | A | 3/2006 |

(Continued)

OTHER PUBLICATIONS

Japan Airlines (2020) "Inflight Entertainment/JAL First Class" [online] Accessed on Mar. 16, 2020, website: <URL: https://www.jal.co.jp/jp/ja/inter/service/first/entertainment/index.html>.

*Primary Examiner* — Kile O Blair

(57) ABSTRACT

A sound system includes: a control system that generates a control signal for erasing noise from a signal of the noise in a place close to a head of a user who uses a seat; a silencing speaker system that is installed at the place close to the head of the user who uses the seat and includes M speaker units each emitting a sound based on the control signal; and an emission suppression unit including at least a sound absorbing material that easily absorbs only a sound having a frequency greater than or equal to a predetermined value and configured to make it difficult for the sound having the frequency greater than or equal to the predetermined value emitted from the silencing speaker units to be emitted to a place other than an ear of the user. The m-th silencing speaker unit is arranged so that a sound emitted from the m-th silencing speaker unit in the m-th silencing user direction is silenced at a place other than a place close to the head of the user who uses the seat due to coming around of a sound emitted from the m-th silencing speaker unit in a direction opposite to the m-th silencing user direction.

4 Claims, 23 Drawing Sheets

(52) U.S. Cl.
CPC .................. *G10K 2210/128* (2013.01); *G10K 2210/3026* (2013.01); *G10K 2210/3027* (2013.01); *G10K 2210/3044* (2013.01); *G10K 2210/3046* (2013.01); *G10K 2210/3224* (2013.01); *G10K 2210/509* (2013.01)

(58) Field of Classification Search
CPC ....... G10K 11/17873; G10K 11/17875; G10K 11/17879; G10K 2210/1081
See application file for complete search history.

(56) References Cited

U.S. PATENT DOCUMENTS

| | | | | |
|---|---|---|---|---|
| 2008/0304677 | A1* | 12/2008 | Abolfathi | G10K 11/17875 381/71.1 |
| 2021/0074258 | A1 | 3/2021 | Konno et al. | |

FOREIGN PATENT DOCUMENTS

| | | | | |
|---|---|---|---|---|
| JP | 2008271067 A | 11/2008 | | |
| JP | 2019212940 A | 12/2019 | | |
| WO | WO-9617340 A1 * | 6/1996 | | G10K 11/178 |
| WO | WO-2020052759 A1 * | 3/2020 | | G10K 11/17815 |

* cited by examiner

SOUND SYSTEM

CROSS-REFERENCE TO RELATED APPLICATIONS

This application is a U.S. National Stage Application filed under 35 U.S.C. § 371 claiming priority to International Patent Application No. PCT/JP2020/040453, filed on 28 Oct. 2020, the disclosure of which is hereby incorporated herein by reference in its entirety.

TECHNICAL FIELD

The present invention relates to a technology for reducing noise in a vehicle such as an aircraft or an automobile.

BACKGROUND ART

Conventionally, a user uses earphones or headphones having a noise canceling function in a case where the user is bothered by noise at the time of viewing and hearing a movie or music in an aircraft (see Non Patent Literature 1).

CITATION LIST

Non Patent Literature

Non Patent Literature 1: Inflight Entertainment/JAL First Class, [online], [searched on Mar. 16, 2020], Internet <URL:https://www.jal.co.jp/jp/ja/inter/service/first/entertainment/index.html>

SUMMARY OF INVENTION

Technical Problem

However, wearing earphones and headphones is troublesome for the user. In addition, there are users who do not like wearing due to, for example, disturbance of hairstyle. Some users do not like pressure on their ears due to wearing. Further, wearing earphones or headphones for a long time may make the user feel tired of hearing.

Thus, an object of the present invention is to provide a technology for reducing noise that is heard at the time of seating on a seat of a vehicle without using earphones or headphones.

Solution to Problem

In one aspect of the present invention, a sound system includes: a control system that generates a control signal for erasing noise from a signal of the noise (hereinafter, the signal of the noise is referred to as a noise signal) in a place close to a head of a user who uses a seat; a silencing speaker system that is installed at the place close to the head of the user who uses the seat and includes M speaker units each emitting a sound based on the control signal (hereinafter, the speaker units are referred to as silencing speaker units); and an emission suppression unit including at least a sound absorbing material that easily absorbs only a sound having a frequency greater than or equal to a predetermined value and configured to make it difficult for the sound having the frequency greater than or equal to the predetermined value emitted from the silencing speaker units to be emitted to a place other than an ear of the user, where M is an integer greater than or equal to 1. The M silencing speaker units are defined as a first silencing speaker unit, . . . , and an M-th silencing speaker unit; a direction in which an m-th silencing speaker unit faces the user is defined as an m-th silencing user direction (m=1, . . . , M); and the m-th silencing speaker unit (m=1, . . . , M) is arranged such that a sound emitted from the m-th silencing speaker unit in the m-th silencing user direction is silenced at a place other than a place close to the head of the user who uses the seat due to coming around of a sound emitted from the m-th silencing speaker unit in a direction opposite to the m-th silencing user direction.

Advantageous Effects of Invention

According to the present invention, it is possible to reduce noise that is heard at the time of seating on a seat of a vehicle.

DESCRIPTION OF EMBODIMENTS

Figure 1:
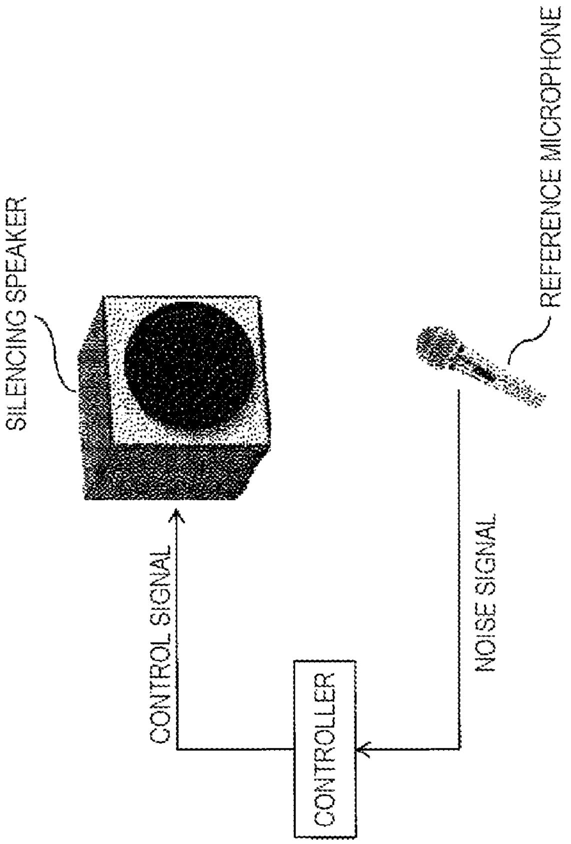
FIG. 1 is a diagram illustrating an example of a configuration of an active noise control system.

Hereinafter, embodiments of the present invention will be described. Note that components having the same functions are denoted by the same reference numerals, and redundant description will be omitted.

Technical Background

To reduce noise that is heard at the time of seating on a seat of an aircraft, active noise control is used that is one of noise reduction technologies (see Reference Non Patent Literatures 1 and 2).

(Reference Non Patent Literature 1: ANC noise reduction testing system, [online], [searched on Mar. 16, 2020], Internet <URL: https://micronet.jp/product/anc/index-.html>)

(Reference Non Patent Literature 2: Active Noise Control (The Institute of Electronics, Information and Communication Engineers "Forest of Knowledge" Group 2, Part 6, Chapter 6), [online], [Searched on Mar. 16, 2020], Internet <URL: http://www.ieice-hbkb.org/files/02/02gun_06hen_06.pdf>)

FIG. 1 is a diagram illustrating an example of a configuration of an active noise control system. The active noise control system includes a microphone (hereinafter, referred to as a reference microphone) that collects noise, a controller that generates a control signal for erasing the noise from a signal (hereinafter, referred to as a noise signal) output from the reference microphone, and a silencing speaker that emits a sound based on the control signal. Note that the active noise control system may further include a microphone (hereinafter, referred to as an error microphone) that collects a sound that has not been erased, and may feed back a signal (hereinafter, referred to as an error signal) output from the error microphone to the controller, and the controller may generate the control signal by using also the error signal.

Since main components of noise in the aircraft are concentrated in a low frequency range, if the silencing speaker does not have a certain size, a low-frequency sound cannot be sufficiently reproduced, and a sufficient noise reduction effect cannot be obtained. However, when the silencing speaker is large, it is difficult to use the silencing speaker in the seat of the aircraft. In addition, if the sound from the silencing speaker is collected by the reference microphone, a signal of the sound from the silencing speaker is included in the noise signal, and there is also a problem that noise reduction performance is degraded.

Figure 2:
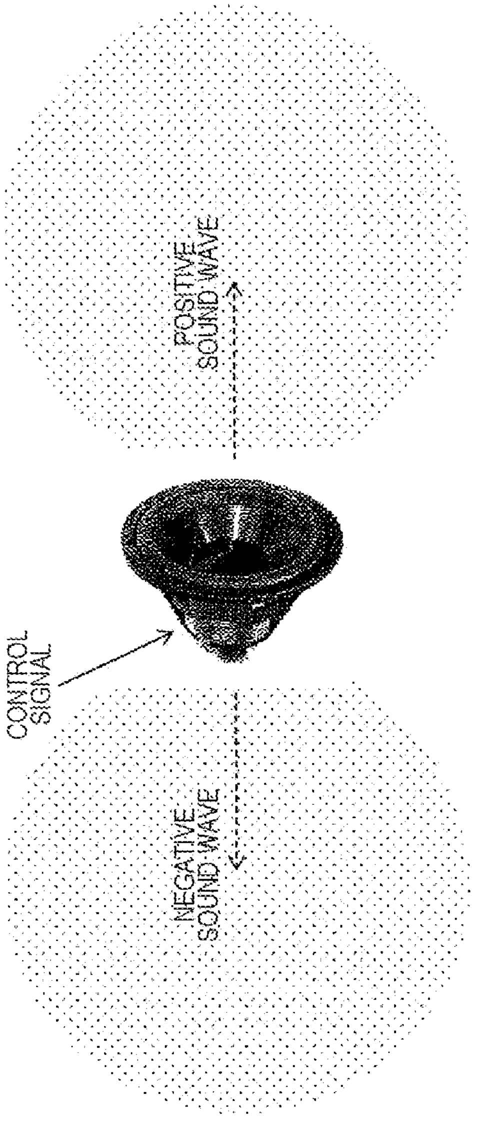
FIG. 2 is a diagram for explaining directivity of a sound emitted from a speaker unit.

To solve these two problems, in the present invention, a speaker unit is used instead of using a speaker to emit the sound based on the control signal (see FIG. 2).

Usually, a speaker includes a speaker unit and a speaker box. The speaker unit is a component including a diaphragm that converts an acoustic signal that is an electric signal into vibration of air (that is, a sound wave is generated). The speaker box is a component that houses the speaker unit.

When the acoustic signal is input to the speaker, the diaphragm of the speaker unit vibrates, and sound waves are emitted in both directions in which the diaphragm vibrates. Here, a sound wave emitted to the outside of the speaker box (that is, a front direction of the speaker unit) is referred to as a positive sound wave, and a sound wave emitted to the inside of the speaker box (that is, a back direction of the speaker unit) is referred to as a negative sound wave. The negative sound wave is a sound wave having a phase opposite to the phase of the positive sound wave. In a case where the speaker is used, the positive sound wave will be emitted from the speaker in all directions, while the negative sound wave will not come out of the speaker box. On the other hand, in a case where only the speaker unit is used, since there is no speaker box, the negative sound wave is also emitted. In this case, since the positive sound wave and the negative sound wave are in opposite phase relationship with each other, the positive sound wave and the negative sound wave cancel each other; however, in the vicinity of the speaker unit, coming around of the negative sound wave is not in time, and thus the positive sound wave remains. If the remaining positive sound wave and the noise are in opposite phase relationship, the positive sound wave and the noise cancel each other out, so that a noise reduction effect can be obtained in the vicinity of the speaker unit.

That is, if the speaker unit is installed at a place close to an ear of a user without using the speaker box, noise reduction in the aircraft can be achieved. In addition, since a range in which the positive sound wave remains is limited to a relatively narrow range such as the vicinity of the speaker unit, coming around to the reference microphone is also suppressed, and degradation of noise reduction performance can also be suppressed.

A form in which only the speaker unit is installed has merit that an installation space can be minimized because the speaker box is not used. Further, in addition to the merit, the form in which only the speaker unit is installed has merit that a low-frequency sound is generated as compared with a form in which the speaker unit is installed in combination with the speaker box. Hereinafter, a reason of that will be described. In general, when the speaker unit is housed in the speaker box, the negative sound wave does not come out of the speaker box, but when the speaker unit is housed in the speaker box, the negative sound wave is confined in the speaker box, and air vibration of the negative sound wave with no place to go suppresses a cone of the speaker unit and interferes with the next vibration of the cone. As a result, even if the speaker unit is housed in the speaker box, the low-frequency sound is not generated. Thus, it is conceivable to fill the inside of the speaker box with a sound absorbing material, but an effect of that cannot be sufficiently obtained for the low-frequency sound, and the speaker box needs to be large to some extent to generate the low-frequency sound. That is, after all, if a speaker box that is sufficiently small enough to be installed in the seat in the aircraft is used, a sufficiently low-frequency sound cannot be obtained.

First Embodiment

A system that reproduces an acoustic signal is referred to as a sound system. The sound system includes a speaker system for emitting the acoustic signal as a sound (hereinafter, this sound is referred to as a sound based on the acoustic signal). Here, the speaker system is a device that converts the acoustic signal that is an analog signal into the sound. In addition, the acoustic signal to be a reproduction target in the sound system is, for example, the acoustic signal obtained from data recorded in a CD, a DVD, or a record, data received through the Internet, or a signal received through radio broadcasting or television broadcasting.

Figure 3:
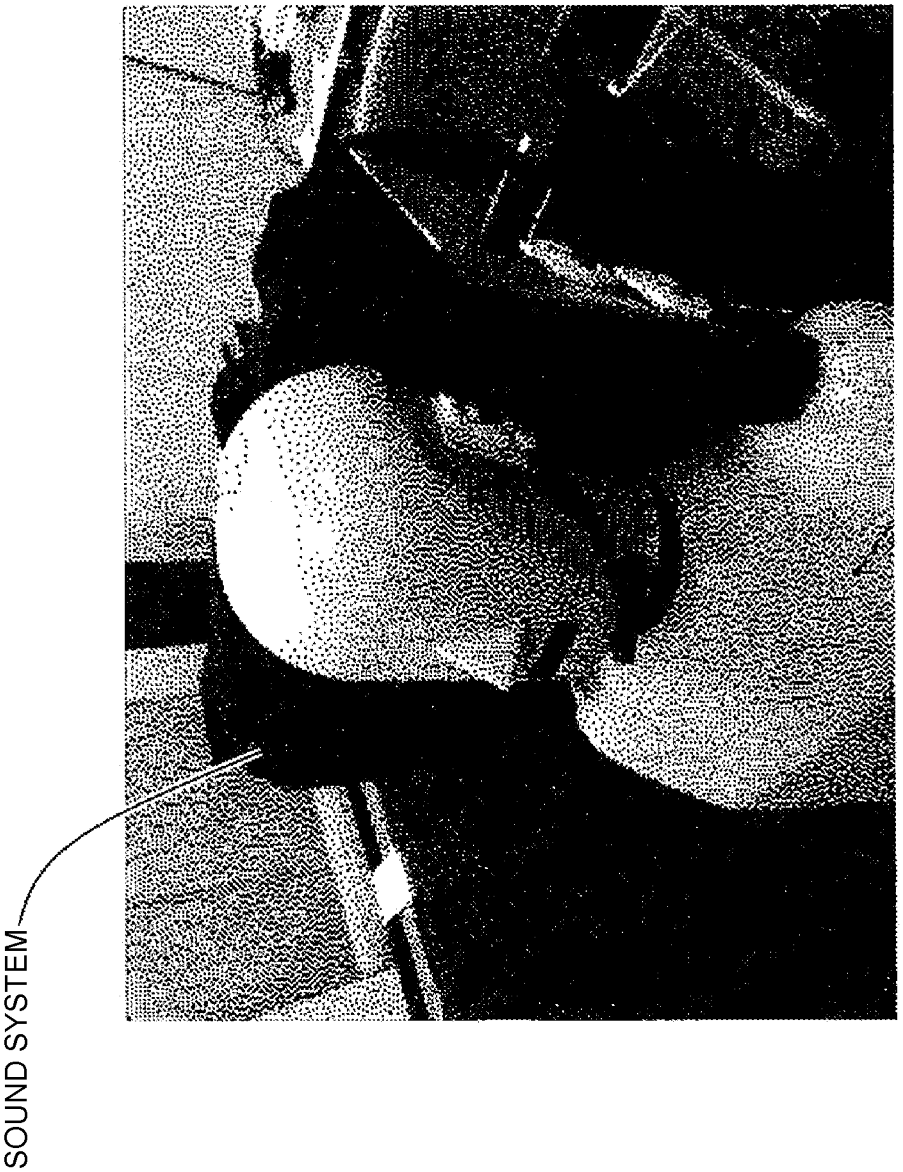
FIG. 3 is a diagram illustrating an example of a sound system installed in a seat of an aircraft.

Hereinafter, a description will be given of a sound system that reproduces a control signal generated from a noise signal obtained from noise around a user in the vicinity of the speaker system to reduce the noise. When such a sound system is used, for example, as a sound system for a user who uses a seat of an aircraft, it is possible to provide a system capable of reducing noise around the user who uses the seat. FIG. 3 is a diagram illustrating an example of the sound system installed in the seat of the aircraft. The sound system in FIG. 3 is arranged so that the speaker system is near the head of the seated user. Note that such a sound system can also be installed in vehicles other than aircrafts, such as automobiles and trains, and chairs used in residences, commercial facilities, and the like, and can also be installed in a wearable form such as being placed on a shoulder. In addition, a driver unit pair in which two driver units corresponding to the above-described speaker unit pair are arranged may be installed in each of left and right units of headphones and earphones.

Figure 4:
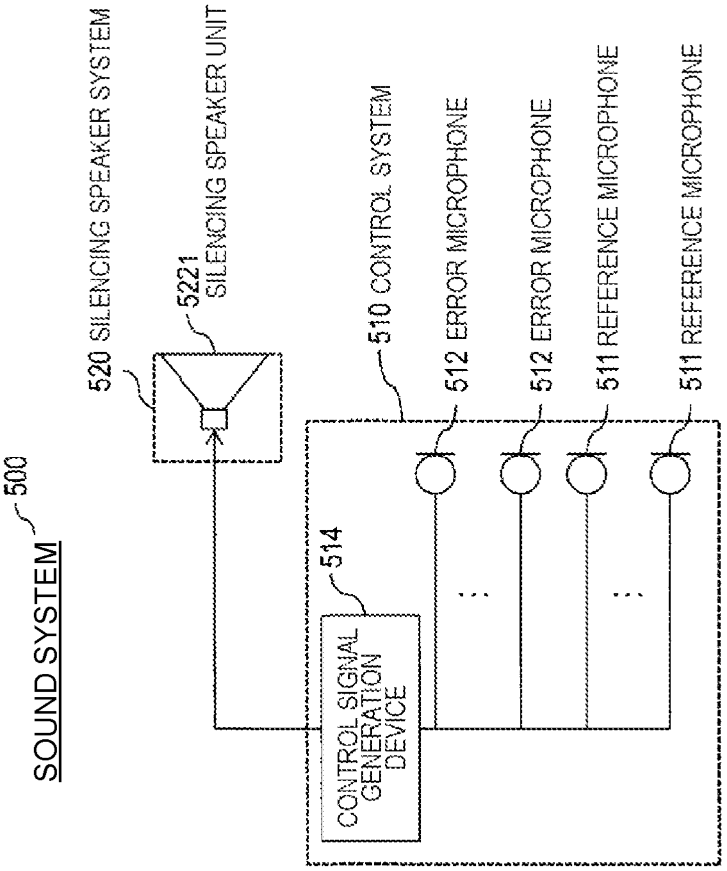
FIG. 4 is a block diagram illustrating an example of a configuration of a sound system 500.
Figure 5:
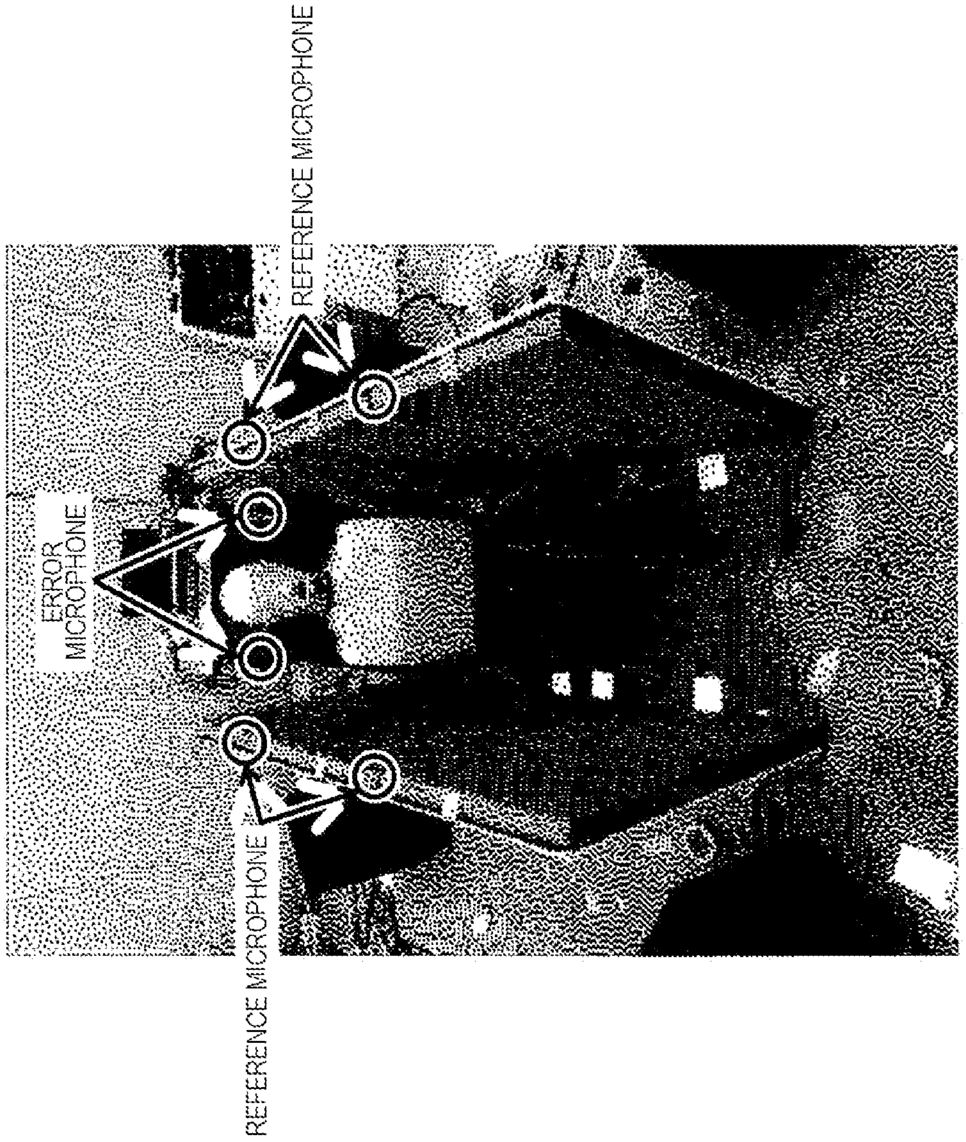
FIG. 5 is a diagram illustrating an example of an arrangement of reference microphones and error microphones.

Hereinafter, a sound system 500 will be described with reference to FIG. 4. FIG. 4 is a block diagram illustrating a configuration of the sound system 500. As illustrated in FIG. 4, the sound system 500 includes a control system 510 and a silencing speaker system 520. The control system 510 includes K (K is an integer greater than or equal to 1) reference microphones 511, L (L is an integer greater than or equal to 0) error microphones 512, and a control signal generation device 514. Here, as described in <Technical Background>, the reference microphone and the error microphone are respectively a microphone that collects noise and a microphone that collects a sound that has not been erased. The error microphone is used for filter update, and is practically used in many cases. Note that the minimum number of microphones required for the sound system 500 is 1 (in a case where K=1 and L=0). FIG. 5 is a diagram illustrating an arrangement of the reference microphones and the error microphones in a case where K=4 and L=2. As illustrated in FIG. 5, the reference microphones are preferably arranged at positions where noise arrives earlier than at the error microphone. In addition, since the error microphones are ideally arranged at positions of the ears of the user, it is preferable to arrange the error microphones at positions as close to the ears as possible. In addition, the silencing speaker system 520 includes one silencing speaker unit 5221 that is a speaker unit that emits a sound based on the control signal. The silencing speaker system 520 is installed at a place close to the head of the user who uses the seat.

Note that a direction in which the silencing speaker unit 5221 faces the user is defined as a silencing user direction, and the silencing speaker unit 5221 is arranged so that a sound emitted from the silencing speaker unit 5221 in the silencing user direction is silenced at a place other than the place close to the head of the user who uses the seat due to coming around of a sound emitted from the silencing speaker unit 5221 in a direction opposite to the silencing user direction. Here, the silencing user direction is a front direction of the silencing speaker unit 5221. In addition, the direction opposite to the silencing user direction is a back direction of the silencing speaker unit 5221.

Hereinafter, operation of the sound system 500 will be described with reference to FIG. 4.

The control system 510 generates and outputs a control signal for erasing noise from a signal (hereinafter, referred to as a noise signal) obtained from the noise at the place close to the head of the user who uses the seat of the aircraft. More specifically, each reference microphone 511 collects noise in the place close to the head of the user who uses the seat of the aircraft, and outputs the noise signal obtained by converting the noise into an electric signal. Each error microphone 512 collects a sound that has not been erased in a place extremely close to the head of the user, and outputs an error signal obtained by converting the sound that has not been erased into an electric signal. The control signal generation device 514 generates the control signal from the noise signal by using the error signal, with the noise signal and the error signal as inputs, and outputs the control signal. The control signal may be a signal having substantially the same amplitude as and an opposite phase to the noise signal.

The silencing speaker system 520 emits a sound based on the control signal, with the control signal output by the control system 510 as an input. More specifically, the silencing speaker unit 5221 emits the sound based on the control signal, with the control signal as an input.

According to the embodiment of the present invention, it is possible to reduce noise that is heard at the time of seating in the seat of the aircraft.

Second Embodiment

Since the sound system 500 of the first embodiment uses only one silencing speaker unit, a range in which noise is reduced is narrow. Here, a description will be given of a sound system including two or more silencing speaker units so that the silencing speaker units can be installed at positions close to both ears of a user.

Figure 6:
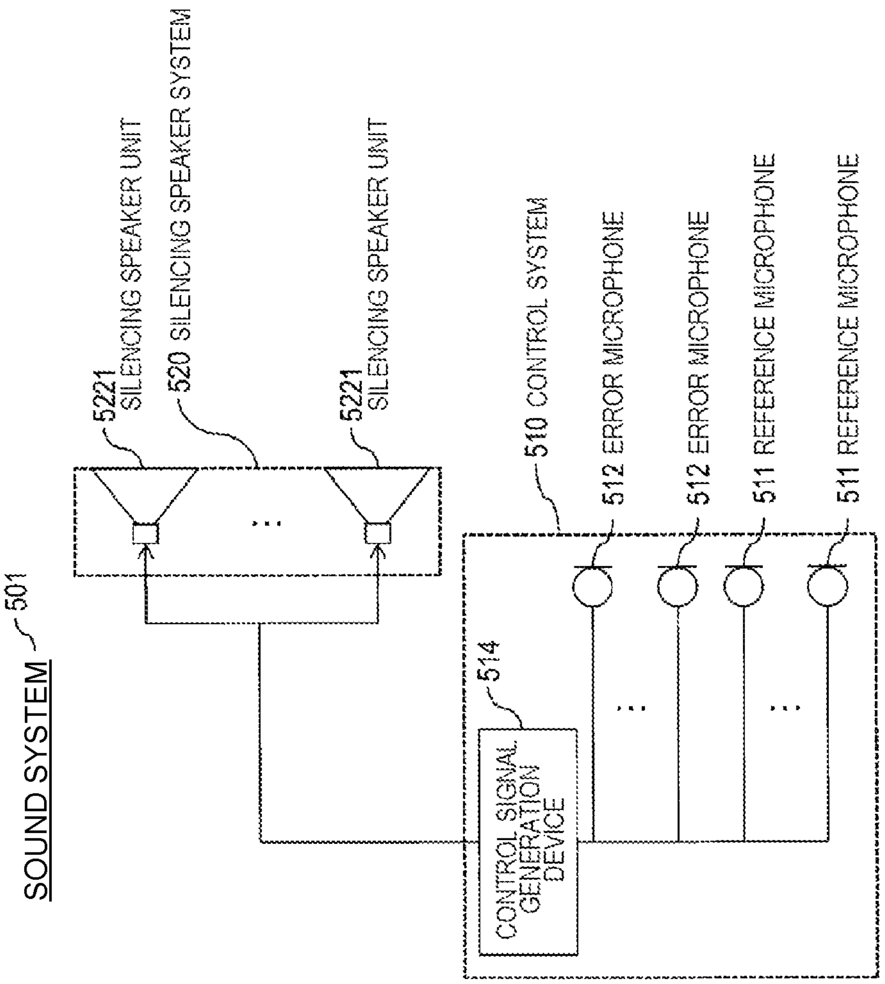
FIG. 6 is a block diagram illustrating an example of a configuration of a sound system 501.

Hereinafter, a sound system 501 will be described with reference to FIG. 6. FIG. 6 is a block diagram illustrating a configuration of the sound system 501. As illustrated in FIG. 6, similarly to the sound system 500, the sound system 501 includes a control system 510 and a silencing speaker system 520. However, the sound system 501 is different from the sound system 500 in that the silencing speaker system 520 includes M (M is an integer greater than or equal to 2) silencing speaker units 5221. The same control signal is input to the M silencing speaker units 5221.

Hereinafter, the M silencing speaker units are referred to as a first silencing speaker unit, . . . , and an M-th silencing speaker unit. In addition, a direction in which an m-th silencing speaker unit faces the user is defined as an m-th silencing user direction (m=1, . . . , M), and the m-th silencing speaker unit (m=1, . . . , M) is arranged so that a sound emitted from the m-th silencing speaker unit in the m-th silencing user direction is silenced at a place other than a place close to the head of the user who uses the seat due to coming around of a sound emitted from the m-th silencing speaker unit in a direction opposite to the m-th silencing user direction. Here, the m-th silencing user direction is a front direction of the m-th silencing speaker unit 5221. The direction opposite to the m-th silencing user direction is a back direction of the m-th silencing speaker unit 5221.

Hereinafter, operation of the silencing speaker system 520 will be described with reference to FIG. 6.

The silencing speaker system 520 emits a sound based on the control signal, with the control signal output by the control system 510 as an input. More specifically, the m-th silencing speaker unit 5221 (m=1, . . . , M) emits the sound based on the control signal, with the control signal as an input.

Here, M is an integer greater than or equal to 2, but when M=1, this embodiment is the same as the first embodiment.

According to the embodiment of the present invention, it is possible to reduce noise that is heard at the time of seating in the seat of the aircraft.

Third Embodiment

In the sound system 501 according to the second embodiment, the number of silencing speaker units is increased to widen the range in which noise is reduced. Here, a description will be given of a sound system having a structure in which the range in which noise is reduced is widened by one silencing speaker unit.

Figure 7:
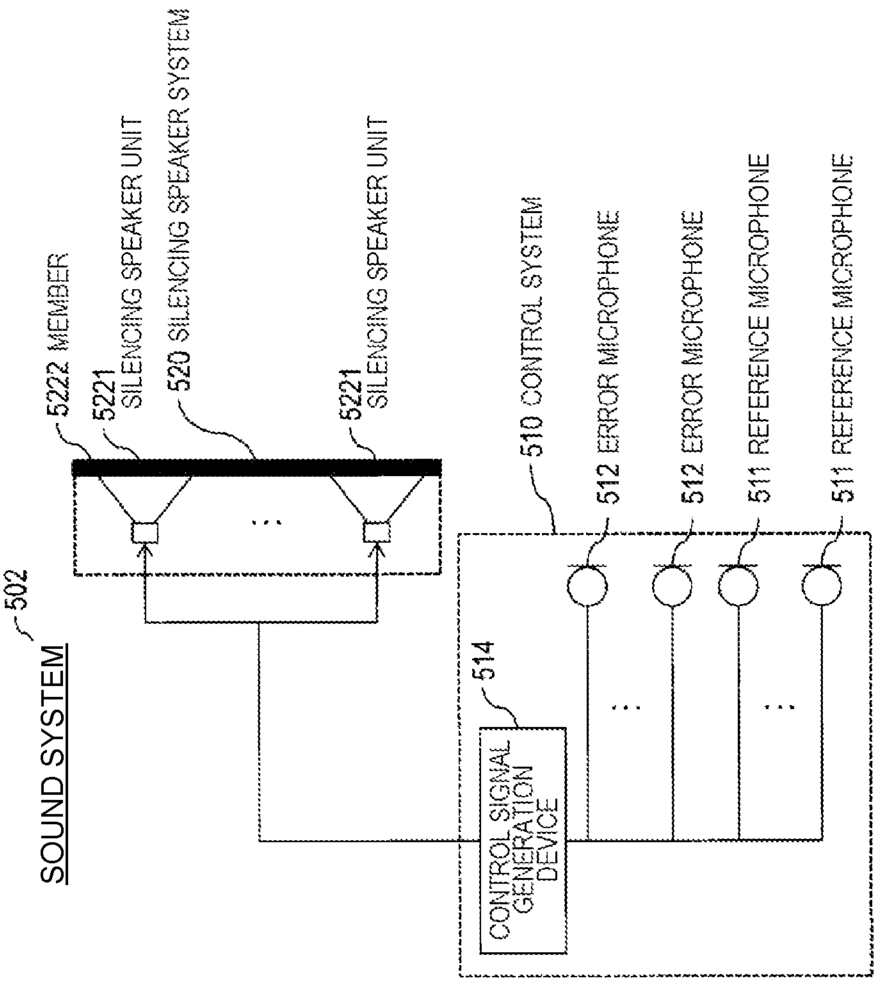
FIG. 7 is a block diagram illustrating an example of a configuration of a sound system 502.

Hereinafter, a sound system 502 will be described with reference to FIG. 7. FIG. 7 is a block diagram illustrating a configuration of the sound system 502. As illustrated in FIG. 7, similarly to the sound system 501, the sound system 502 includes a control system 510 and a silencing speaker system 520. However, the sound system 502 is different from the sound system 501 in that a member 5222 is attached to an m-th silencing speaker unit 5221 (m=1, . . . , M).

Hereinafter, a structure of the m-th silencing speaker unit 5221 (m=1, . . . , M) will be described with reference to FIG. 7.

Figure 8:
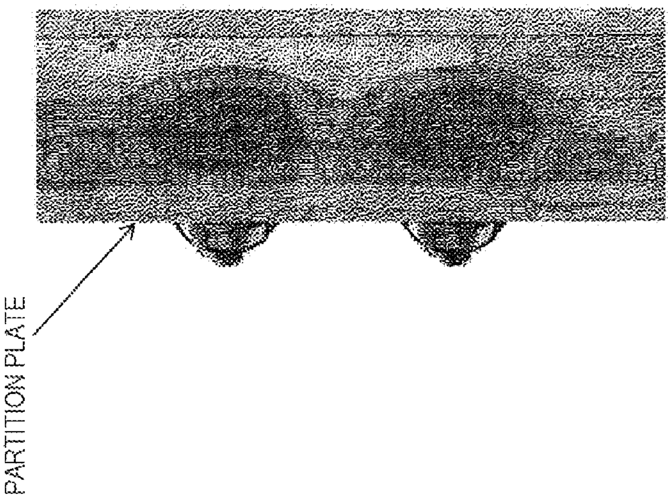
FIG. 8 is a diagram illustrating an example of a configuration of a silencing speaker system 520 to which a member 5222 is attached.

The member 5222 is attached to the m-th silencing speaker unit 5221 to lengthen a sound path in which a sound emitted from the m-th silencing speaker unit 5221 in a direction opposite to an m-th silencing user direction comes around in the m-th silencing user direction (see FIG. 8). The member 5222 may be, for example, a member such as a partition plate that prevents coming around of the sound from the back of the speaker unit. The member 5222 is attached to prevent interference of sound waves and widen the range in which noise is reduced.

The m-th silencing speaker unit 5221 to which the member 5222 is attached has a wider range in which noise is reduced than that of the m-th silencing speaker unit 5221 of the second embodiment.

According to the embodiment of the present invention, it is possible to reduce noise that is heard at the time of seating in the seat of the aircraft.

Fourth Embodiment

In the first to third embodiments, the description has been given of the sound system (sound system for noise reduction) for reducing noise around a user who uses a seat of an aircraft. The sound system for noise reduction of these embodiments can be combined with a sound system (sound system for reproduction) that performs reproduction so that a sound based on an acoustic signal obtained from a reproduction target can be heard only by a user in the vicinity of the speaker system. Here, the reproduction target is, for example, data or a signal from which an acoustic signal can be obtained by predetermined processing, such as data recorded in a CD, a DVD, or a record, data received through the Internet, or a signal received through radio broadcasting or television broadcasting.

Figure 9:
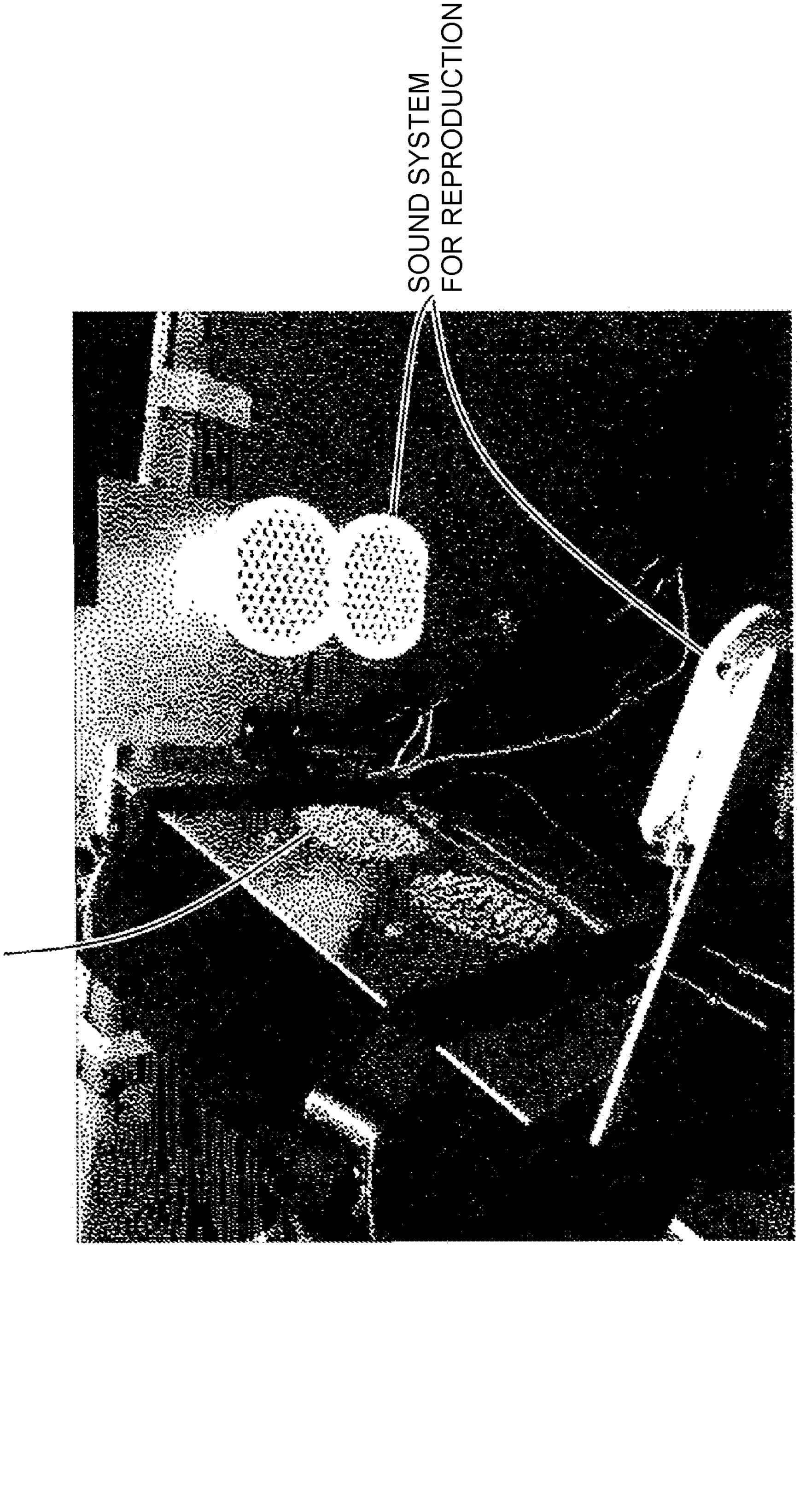
FIG. 9 is a diagram illustrating an example of the sound system installed in the seat of the aircraft.

FIG. 9 illustrates an example of a sound system in which the sound system for noise reduction and the sound system for reproduction are combined. FIG. 9 is a diagram illustrating an example of the sound system installed in the seat of the aircraft. The speaker system of the sound system for reproduction in FIG. 9 is installed in the seat to sandwich the head of the seated user, and is arranged so that the speaker unit pair is near the left and right ears. On the other hand, the silencing speaker system of the sound system for noise reduction is installed in the seat to be behind the head of the seated user. Note that the sound system can also be installed in vehicles other than aircrafts such as automobiles and trains, a reclining chair, and the like, and can also be installed in a wearable form such as being placed on a shoulder. In addition, for the sound system for reproduction, similarly to the sound system for noise reduction, a driver unit pair in which two driver units corresponding to the above-described speaker unit pair are arranged may be installed in each of left and right units of headphones and earphones. The headphones are generally roughly classified into two types, an open type (open air type) and a sealed type (closed type), and when the above-described technology is applied particularly to the open type in which there is a concern about sound leakage, the sound leakage is expected to be reduced.

Figure 10:
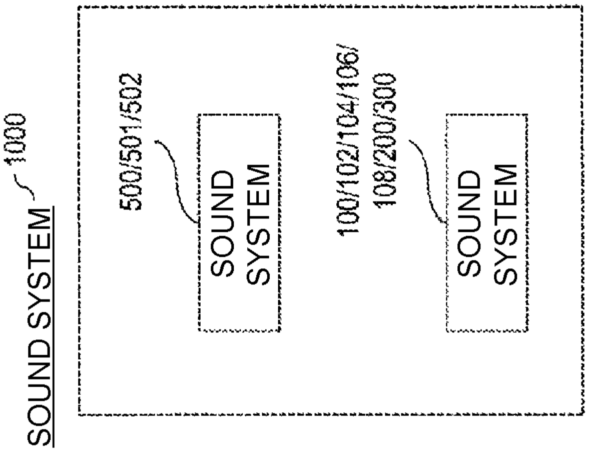
FIG. 10 is a block diagram illustrating an example of a configuration of a sound system 1000.

Hereinafter, a sound system 1000 will be described with reference to FIG. 10. FIG. 10 is a block diagram illustrating a configuration of the sound system 1000. The sound system 1000 includes the sound system for noise reduction and the sound system for reproduction. The sound system for noise reduction can be a sound system 500, a sound system 501, a sound system 502, and a sound system 530 described later. On the other hand, the sound system for reproduction can be a sound system 100, a sound system 102, a sound system 104, a sound system 106, a sound system 108, a sound system 200, and a sound system 300 described later.

Hereinafter, each form of the sound system for reproduction will be described.

Form 1: Sound System 100

Figure 11:
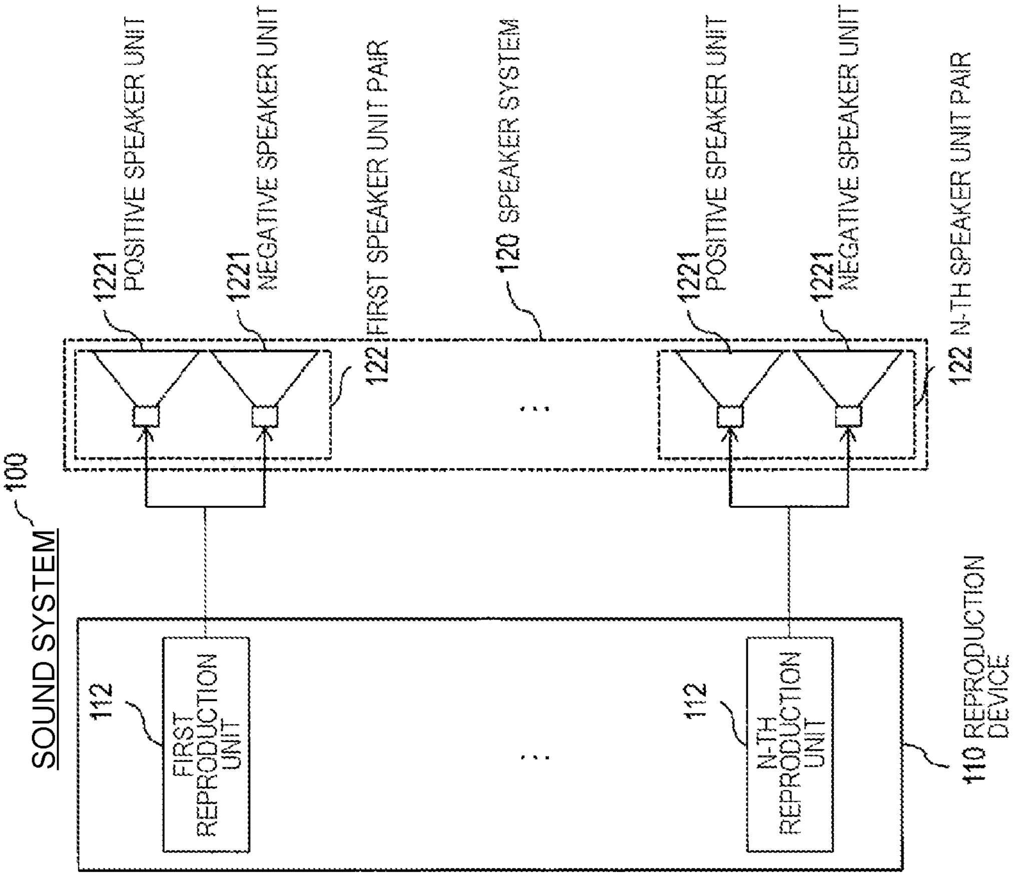
FIG. 11 is a block diagram illustrating an example of a configuration of a sound system 100.

Hereinafter, the sound system 100 will be described with reference to FIG. 11. FIG. 11 is a block diagram illustrating a configuration of the sound system 100. As illustrated in FIG. 11, the sound system 100 includes a reproduction device 110 and a speaker system 120. The reproduction device 110 includes N (where N is an integer greater than or equal to 1) reproduction units 112 (that is, a first reproduction unit 112, . . . , and an N-th reproduction unit 112). In addition, the speaker system 120 also includes N speaker unit pairs 122 (that is, a first speaker unit pair 122, . . . , and an N-th speaker unit pair 122). Each speaker unit pair 122 includes two speaker units (that is, a positive speaker unit 1221 and a negative speaker unit 1221). An acoustic signal having a phase opposite to that of an acoustic signal input to the positive speaker unit 1221 is input to the negative speaker unit 1221. The speaker system 120 is installed at a place close to the head of the user who uses the seat.

Note that a direction in which the n-th speaker unit pair 122 faces the user is defined as an n-th user direction (n=1, . . . , N), and the positive speaker unit 1221 and the negative speaker unit 1221 of the n-th speaker unit pair 122 (n=1, . . . , N) are arranged so that a sound emitted from the positive speaker unit 1221 in a direction opposite to the n-th user direction and a sound emitted from the negative speaker unit 1221 in the direction opposite to the n-th user direction are transmitted in the n-th user direction by coming around. Here, the n-th user direction is a front direction of the positive speaker unit 1221 and the negative speaker unit 1221 of the n-th speaker unit pair 122. In addition, the direction opposite to the n-th user direction is a back direction of the positive speaker unit 1221 and the negative speaker unit 1221 of the n-th speaker unit pair 122.

In addition, the positive speaker unit 1221 and the negative speaker unit 1221 of the n-th speaker unit pair 122 (n=1, . . . , N) are arranged in a positional relationship in which a sound emitted from the positive speaker unit 1221 and a sound emitted from the negative speaker unit 1221 are mutually erased so that the sounds cannot be heard by a user who uses another seat.

Hereinafter, operation of the sound system 100 will be described with reference to FIG. 11.

The reproduction device 110 outputs a first acoustic signal, a second acoustic signal, . . . , and a 2N-th acoustic signal, with the first acoustic signal, a third acoustic signal, . . . , and an (2N−1)-th acoustic signal that are acoustic signals obtained on the basis of the reproduction target as inputs. More specifically, an n-th reproduction unit 112 (n=1, . . . , N) generates a 2n-th acoustic signal that is an acoustic signal having a phase opposite to that of a (2n−1)-th acoustic signal from the (2n−1)-th acoustic signal, with the (2n−1)-th acoustic signal as an input, and outputs the (2n−1)-th acoustic signal and the 2n-th acoustic signal. The (2n−1)-th acoustic signal and the 2n-th acoustic signal are input to the positive speaker unit 1221 and the negative speaker unit 1221 of the n-th speaker unit pair 122, respectively.

The speaker system 120 emits a sound based on the first acoustic signal, a sound based on the second acoustic signal, . . . , and a sound based on the 2N-th acoustic signal, with the first acoustic signal, the second acoustic signal, . . . , and the 2N-th acoustic signal output by the reproduction device 110 as inputs. More specifically, the n-th speaker unit pair 122 (n=1, . . . , N) emits a sound based on the (2n−1)-th acoustic signal from the positive speaker unit 1221, and emits a sound based on the 2n-th acoustic signal from the negative speaker unit 1221, with the (2n−1)-th acoustic signal and the 2n-th acoustic signal as inputs. Since the (2n−1)-th acoustic signal and the 2n-th acoustic signal are in opposite phase relationship with each other, the sound is heard only in the vicinity of the seat where the speaker system 120 is installed. For example, in the case of N=2, when the first acoustic signal and the third acoustic signal are respectively an acoustic signal of a right channel and an acoustic signal of a left channel of a certain sound source, a stereo sound can be heard only in the vicinity of the seat where the speaker system 120 is installed.

Note that a sound emitted from the positive speaker unit 1221 of the n-th speaker unit pair 122 in the n-th user direction and a sound emitted from the positive speaker unit 1221 of the n-th speaker unit pair 122 in the direction opposite to the n-th user direction are in opposite phase relationship with each other. Similarly, a sound emitted from the negative speaker unit 1221 of the n-th speaker unit pair 122 in the n-th user direction and a sound emitted from the negative speaker unit 1221 of the n-th speaker unit pair 122 in the direction opposite to the n-th user direction are in opposite phase relationship with each other.

Form 2: Sound System 102

In the sound system 100, a range in which emitted sound is heard, that is, a so-called sweet spot is narrow. Here, a description will be given of a sound system having a structure for widening the sweet spot.

Figure 12:
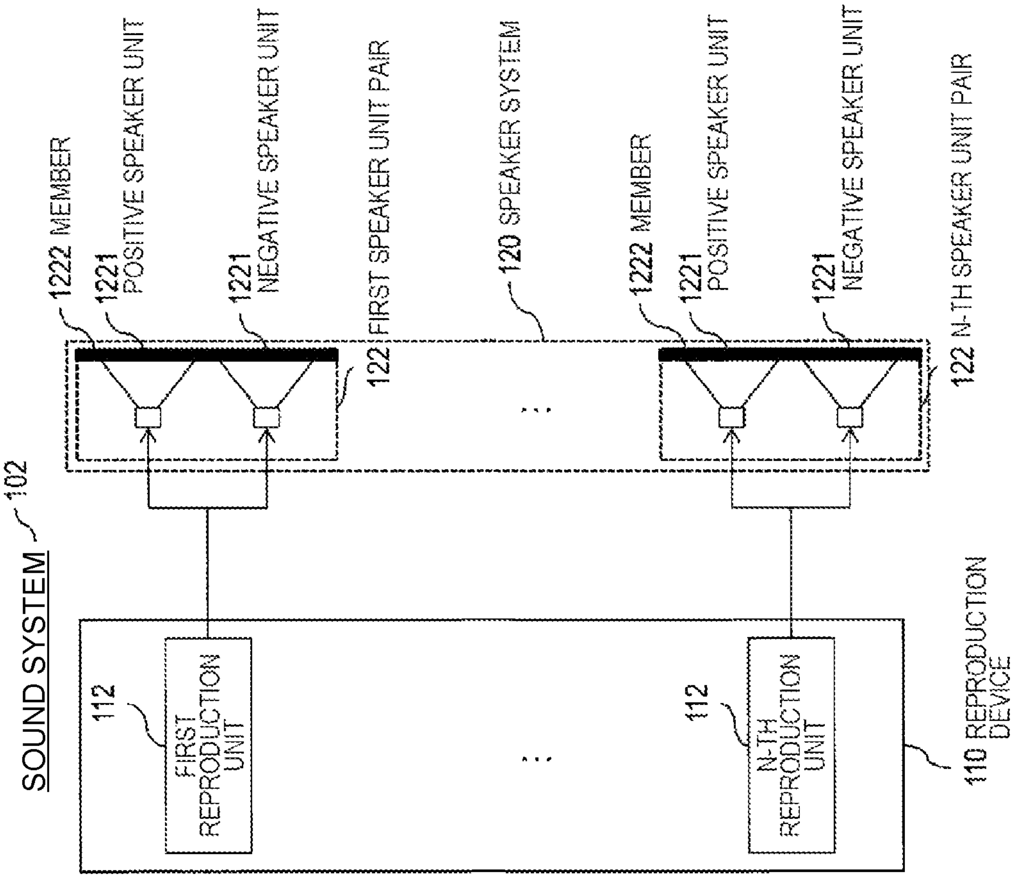
FIG. 12 is a block diagram illustrating an example of a configuration of a sound system 102.

Hereinafter, the sound system 102 will be described with reference to FIG. 12. FIG. 12 is a block diagram illustrating a configuration of the sound system 102. As illustrated in FIG. 12, similarly to the sound system 100, the sound system 102 includes the reproduction device 110 and the speaker system 120. However, the sound system 102 is different from the sound system 100 in that a member 1222 is attached to the speaker unit pair 122.

Hereinafter, a structure of the n-th speaker unit pair 122 (n=1, . . . , N) will be described with reference to FIG. 12.

Figure 13:
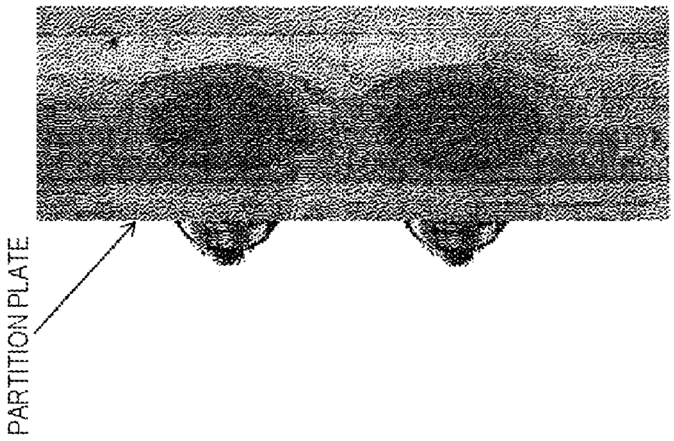
FIG. 13 is a diagram illustrating an example of a configuration of a speaker unit pair 122 to which a member 1222 is attached.

The member 1222 is attached to the n-th speaker unit pair 122 to lengthen a sound path in which sounds emitted from the positive speaker unit 1221 and the negative speaker unit 1221 of the n-th speaker unit pair 122 in the direction opposite to the n-th user direction come around in the user direction (see FIG. 13). The member 1222 may be, for example, a member such as a partition plate that prevents coming around of the sound from the back of the speaker unit. The member 1222 is attached not to prevent the coming around of the sound but to increase a phase difference between the sound coming around from the back and the sound from the front, that is, to increase the path of the sound coming around.

The n-th speaker unit pair 122 to which the member 1222 is attached has a wider sweet spot than that of the n-th speaker unit pair 122 of Form 1.

Form 3: Sound System 104

Since a high-frequency sound has a short wavelength, it is difficult to make phases of a sound coming around from the back and a sound from the front the same. For that reason, the high-frequency sound has a characteristic of being less likely to be erased in the vicinity of the speaker unit and in a relatively distant place other than the vicinity as compared with the low-frequency sound. Since neither the positive speaker unit 1221 nor the negative speaker unit 1221 of the speaker unit pair 122 constituting the sound system 100 is housed in the speaker box, a range in which the high-frequency sound is heard is wide due to the characteristic, and sound leakage may occur. Thus, here, a description will be given of a sound system having a structure in which the high-frequency sound is less likely to leak out of the vicinity of the speaker system.

Figure 14:
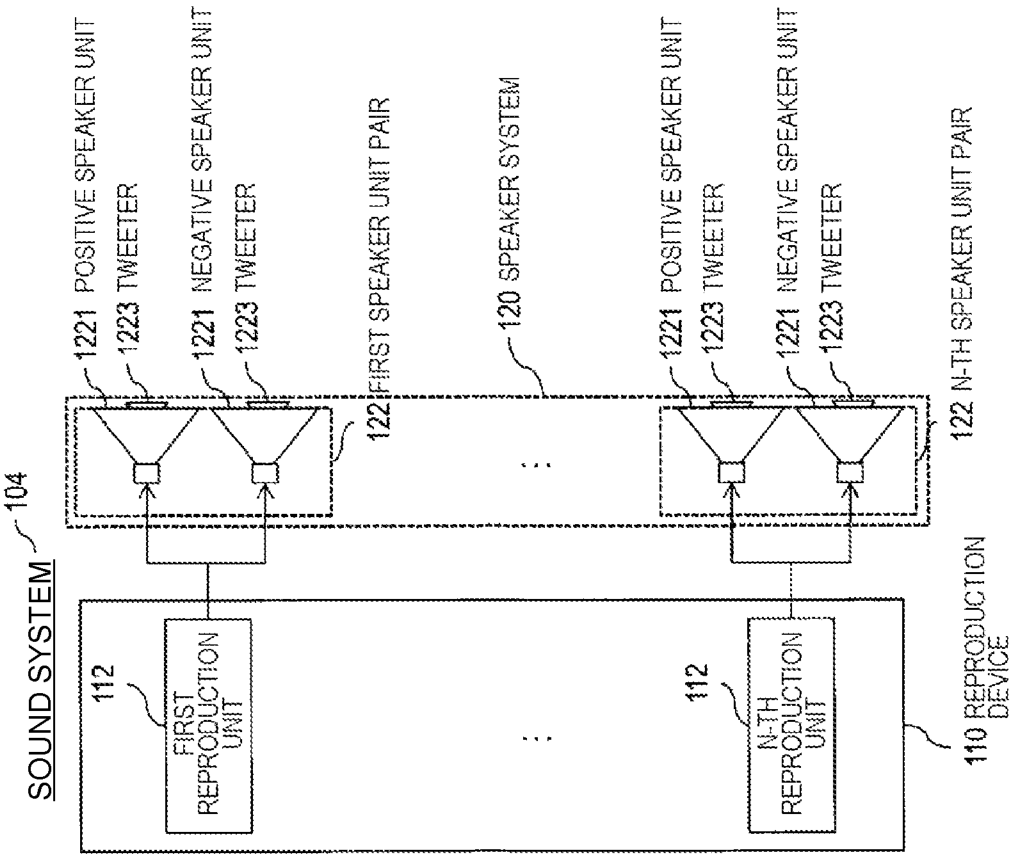
FIG. 14 is a block diagram illustrating an example of a configuration of a sound system 104.

Hereinafter, the sound system 104 will be described with reference to FIG. 14. FIG. 14 is a block diagram illustrating a configuration of the sound system 104. As illustrated in FIG. 14, similarly to the sound system 100, the sound system 104 includes the reproduction device 110 and the speaker system 120. However, the sound system 104 is different from the sound system 100 in that a tweeter 1223 is attached to each of the positive speaker unit 1221 and the negative speaker unit 1221 of the speaker unit pair 122. Here, the tweeter is a speaker unit for reproducing a high-frequency signal. It is assumed that the tweeter 1223 is attached to the positive speaker unit 1221 and the negative speaker unit 1221 in a form in which the sound from the back does not leak as if the tweeter 1223 were housed in the speaker box.

Hereinafter, operation of the speaker system 120 will be described with reference to FIG. 14.

The speaker system 120 emits a sound based on the first acoustic signal, a sound based on the second acoustic signal, . . . , and a sound based on the 2N-th acoustic signal, with the first acoustic signal, the second acoustic signal, . . . , and the 2N-th acoustic signal output by the reproduction device 110 as inputs. More specifically, the n-th speaker unit pair 122 (n=1, . . . , N) emits a sound based on the (2n−1)-th acoustic signal from the positive speaker unit 1221 and the tweeter 1223 attached to the positive speaker unit 1221, and emits a sound based on the 2n-th acoustic signal from the negative speaker unit 1221 and the tweeter 1223 attached to the negative speaker unit 1221, with the (2n−1)-th acoustic signal and the 2n-th acoustic signal as inputs.

A higher frequency sound has a property of higher straightness, but since the system has a shape in which a sound from the back of the tweeter 1223 does not leak, it is possible to prevent a high-frequency sound emitted from the tweeter 1223 from leaking in all directions.

Form 4: Sound System 200

The tweeter is a speaker unit for reproducing a high-frequency signal. Thus, only the high-frequency signal may be input to the tweeter by band division processing. Thus, here, a description will be given of a sound system that performs band division processing.

Figure 15:
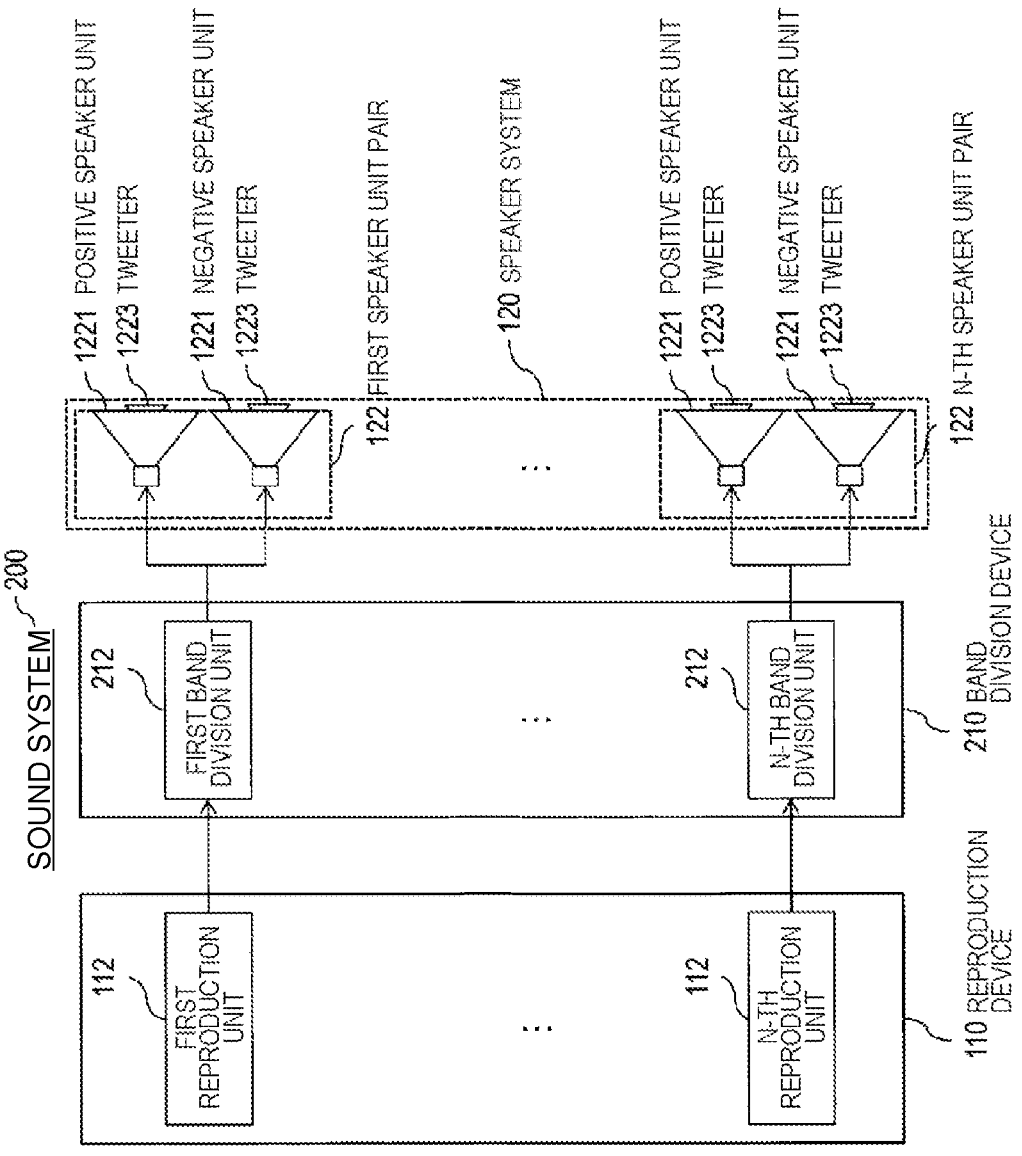
FIG. 15 is a block diagram illustrating an example of a configuration of a sound system 200.

Hereinafter, the sound system 200 will be described with reference to FIG. 15. FIG. 15 is a block diagram illustrating a configuration of the sound system 200. As illustrated in FIG. 15, the sound system 200 includes the reproduction device 110, a band division device 210, and the speaker system 120. The band division device 210 includes N band division units 212 (that is, a first band division unit 212, . . . , and an N-th band division unit 212). The sound system 200 is different from the sound system 104 in that the band division device 210 is included.

Hereinafter, operation of the band division device 210 and the speaker system 120 will be described with reference to FIG. 15.

The band division device 210 outputs a first high-frequency signal that is a high-frequency signal and a first low-frequency signal that is a low-frequency signal of the first acoustic signal, a second high-frequency signal that is a high-frequency signal and a second low-frequency signal that is a low-frequency signal of the second acoustic signal, . . . , and a 2N-th high-frequency signal that is a high-frequency signal and a 2N-th low-frequency signal that is a low-frequency signal of the 2N-th acoustic signal, with the first acoustic signal, the second acoustic signal, . . . , and the 2N-th acoustic signal output by the reproduction device 110 as inputs. More specifically, the n-th band division unit 212 (n=1, . . . , N) generates the (2n−1)-th high-frequency signal that is a high-frequency signal and the (2n−1)-th low-frequency signal that is a low-frequency signal of the (2n−1)-th acoustic signal, generates the 2n-th high-frequency signal that is a high-frequency signal and the 2n-th low-frequency signal that is a low-frequency signal of the 2n-th acoustic signal, with the (2n−1)-th acoustic signal and the 2n-th acoustic signal as inputs, and outputs the (2n−1)-th high-frequency signal, the (2n−1)-th low-frequency signal, the 2n-th high-frequency signal, and the 2n-th low-frequency signal.

The speaker system 120 emits a sound based on the first high-frequency signal, a sound based on the first low-frequency signal, a sound based on the second high-frequency signal, a sound based on the second low-frequency signal, . . . , a sound based on the 2N-th high-frequency signal, and a sound based on the 2N-th low-frequency signal, with the first high-frequency signal, the first low-frequency signal, the second high-frequency signal, the second low-frequency signal, . . . , the 2N-th high-frequency signal, and the 2N-th low-frequency signal output by the band division device 210 as inputs. More specifically, the n-th speaker unit pair 122 (n=1, . . . , N) emits a sound based on the (2n−1)-th low-frequency signal and a sound based on the (2n−1)-th high-frequency signal from the positive speaker unit 1221 and the tweeter 1223 attached to the positive speaker unit 1221, respectively, and emits a sound based on the 2n-th low-frequency signal and a sound based on the 2n-th high-frequency signal from the negative speaker unit 1221 and the tweeter 1223 attached to the negative speaker unit 1221, respectively, with the (2n−1)-th high-frequency signal, the (2n−1)-th low-frequency signal, the 2n-th high-frequency signal, and the 2n-th low-frequency signal as inputs.

Form 5: Sound System 300

In the sound system 200, a speaker unit is used in which the tweeter 1223 is attached to the positive speaker unit 1221 and the negative speaker unit 1221. Here, a description will be given of a sound system using a speaker unit pair including two speaker units and one tweeter instead of using a speaker unit pair including two speaker units to which respective tweeters are attached.

Figure 16:
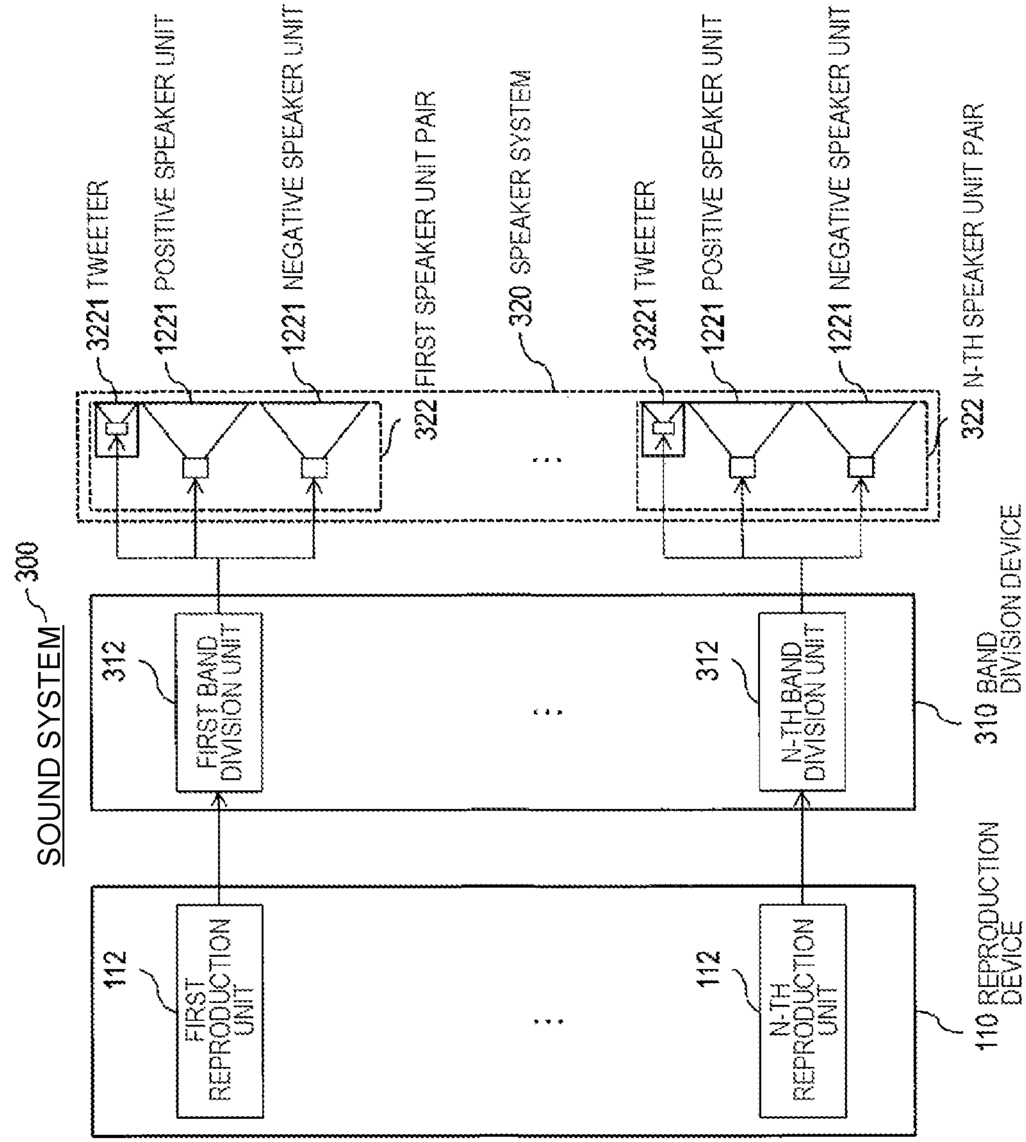
FIG. 16 is a block diagram illustrating an example of a configuration of a sound system 300.

Hereinafter, the sound system 300 will be described with reference to FIG. 16. FIG. 16 is a block diagram illustrating a configuration of the sound system 300. As illustrated in FIG. 16, the sound system 300 includes the reproduction device 110, a band division device 310, and a speaker system 320. The band division device 310 includes N band division units 312 (that is, a first band division unit 312, . . . , and an N-th band division unit 312). In addition, the speaker system 320 also includes N speaker unit pairs 322 (that is, a first speaker unit pair 322, . . . , and an N-th speaker unit pair 322). Each speaker unit pair 322 includes two speaker units (that is, the positive speaker unit 1221 and the negative speaker unit 1221) and a tweeter 3221. The sound system 300 is different from the sound system 200 in that the band division device 310 and the speaker system 320 are included instead of the band division device 210 and the speaker system 120.

Preferably, the tweeter 3221 is housed in a speaker box not to leak a sound from the back. In addition, the speaker system 320 is installed at a place close to the head of the user who uses the seat.

Note that a direction in which the n-th speaker unit pair 322 faces the user is defined as an n-th user direction (n=1, . . . , N), and the positive speaker unit 1221 and the negative speaker unit 1221 of the n-th speaker unit pair 322 (n=1, . . . , N) are arranged so that a sound emitted from the positive speaker unit 1221 in the direction opposite to the n-th user direction and a sound emitted from the negative speaker unit 1221 in the direction opposite to the n-th user direction are transmitted in the n-th user direction by coming around. Here, the n-th user direction is a front direction of the positive speaker unit 1221, the negative speaker unit 1221, and the tweeter 3221 of the n-th speaker unit pair 322. In addition, the direction opposite to the n-th user direction is a back direction of the positive speaker unit 1221, the negative speaker unit 1221, and the tweeter 3221 of the n-th speaker unit pair 322.

In addition, the positive speaker unit 1221 and the negative speaker unit 1221 of the n-th speaker unit pair 322 (n=1, . . . , N) are arranged in a positional relationship in which a sound emitted from the positive speaker unit 1221 and a sound emitted from the negative speaker unit 1221 are mutually erased so that the sounds cannot be heard by a user who uses another seat.

Hereinafter, operation of the band division device 310 and the speaker system 320 will be described with reference to FIG. 16.

The band division device 310 outputs the first high-frequency signal that is a high-frequency signal and the first low-frequency signal that is a low-frequency signal of the first acoustic signal, the second low-frequency signal that is a low-frequency signal of the second acoustic signal, . . . , the (2N−1)-th high-frequency signal that is a high-frequency signal and the (2N−1)-th low-frequency signal that is a low-frequency signal of the (2N−1)-th acoustic signal, and the 2N-th low-frequency signal that is a low-frequency signal of the 2N-th acoustic signal, with the first acoustic signal, the second acoustic signal, . . . , and the 2N-th acoustic signal output by the reproduction device 110 as inputs. More specifically, the n-th band division unit 312 (n=1, . . . , N) generates the (2n−1)-th high-frequency signal that is a high-frequency signal and the (2n−1)-th low-frequency signal that is a low-frequency signal of the (2n−1)-th acoustic signal, generates the 2n-th low-frequency signal that is a low-frequency signal of the 2n-th acoustic signal, with the (2n−1)-th acoustic signal and the 2n-th acoustic signal as inputs, and outputs the (2n−1)-th high-frequency signal, the (2n−1)-th low-frequency signal, and the 2n-th low-frequency signal.

The speaker system 320 emits a sound based on the first high-frequency signal, a sound based on the first low-frequency signal, a sound based on the second low-frequency signal, . . . , a sound based on the (2N−1)-th high-frequency signal, a sound based on the (2N−1)-th low-frequency signal, and a sound based on the 2N-th low-frequency signal, with the first high-frequency signal, the first low-frequency signal, the second low-frequency signal, . . . , the (2N−1)-th high-frequency signal, the (2N−1)-th low-frequency signal, and the 2N-th low-frequency signal output by the band division device 310 as inputs. More specifically, the n-th speaker unit pair 322 (n=1, . . . , N) emits a sound based on the (2n−1)-th high-frequency signal from the tweeter 3221, emits a sound based on the (2n−1)-th low-frequency signal from the positive speaker unit 1221, and emits a sound based on the 2n-th low-frequency signal from the negative speaker unit 1221, with the (2n−1)-th high-frequency signal, the (2n−1)-th low-frequency signal, and the 2n-th low-frequency signal as inputs.

Form 6: Sound System 106

By using the speaker unit 1221 to which the tweeter 1223 is attached, the sound system 104 is a system in which a high-frequency sound hardly leaks. Here, a description will be given of a sound system in which a member having a sound absorbing characteristic is used instead of using a speaker unit to which a tweeter is attached, and a high-frequency sound hardly leaks.

Figure 17:
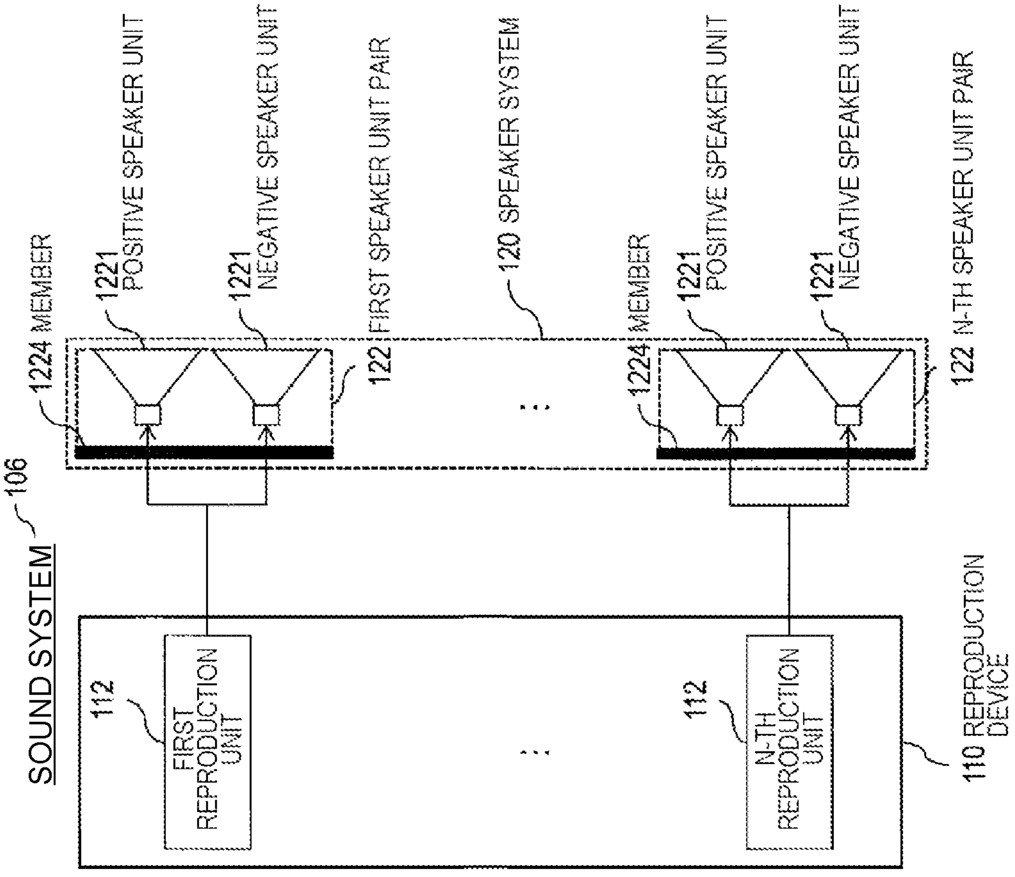
FIG. 17 is a block diagram illustrating an example of a configuration of a sound system 106.

Hereinafter, the sound system 106 will be described with reference to FIG. 17. FIG. 17 is a block diagram illustrating a configuration of the sound system 106. As illustrated in FIG. 17, similarly to the sound system 104, the sound system 106 includes the reproduction device 110 and the speaker system 120. However, the sound system 106 is different from the sound system 104 in that the speaker unit 1221 to which the tweeter 1223 is not attached is used instead of the speaker unit 1221 to which the tweeter 1223 is attached, and a member 1224 is attached to the speaker unit pair 122.

Hereinafter, a structure of the n-th speaker unit pair 122 (n=1, . . . , N) will be described with reference to FIG. 17.

Figure 18:
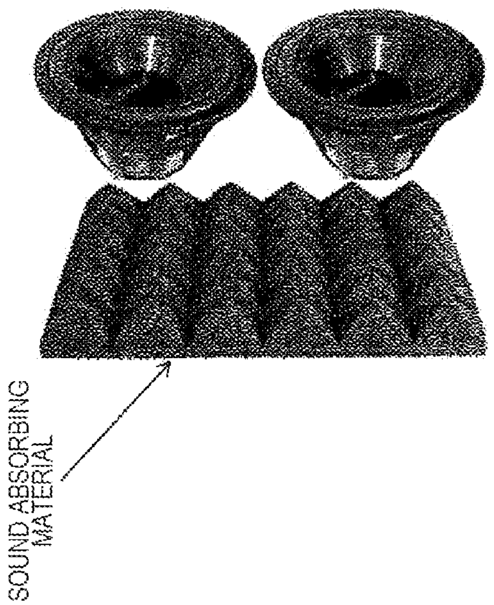
FIG. 18 is a diagram illustrating an example of a configuration of the speaker unit pair 122 to which a member 1224 is attached.

To the n-th speaker unit pair 122, the member 1224 is attached for absorbing a sound emitted in the direction opposite to the n-th user direction from the positive speaker unit 1221 and the negative speaker unit 1221 of the n-th speaker unit pair 122 (see FIG. 18). The member 1224 may be any member as long as a high-frequency sound can be prevented from being emitted from the back. Note that, instead of installing the member 1224 only on the back of the speaker unit pair 122, the member 1224 may be installed to surround other than the front of the speaker unit pair 122.

Form 7: Sound System 108

By using the speaker unit 1221 to which the member 1224 is attached, the sound system 106 is a system in which a high-frequency sound hardly leaks. Here, a description will be given of a sound system in which each speaker unit of a speaker unit pair is housed in a speaker box with a hole instead of using a speaker unit pair to which a sound absorbing material is attached, so that a high-frequency sound hardly leaks.

Figure 19:
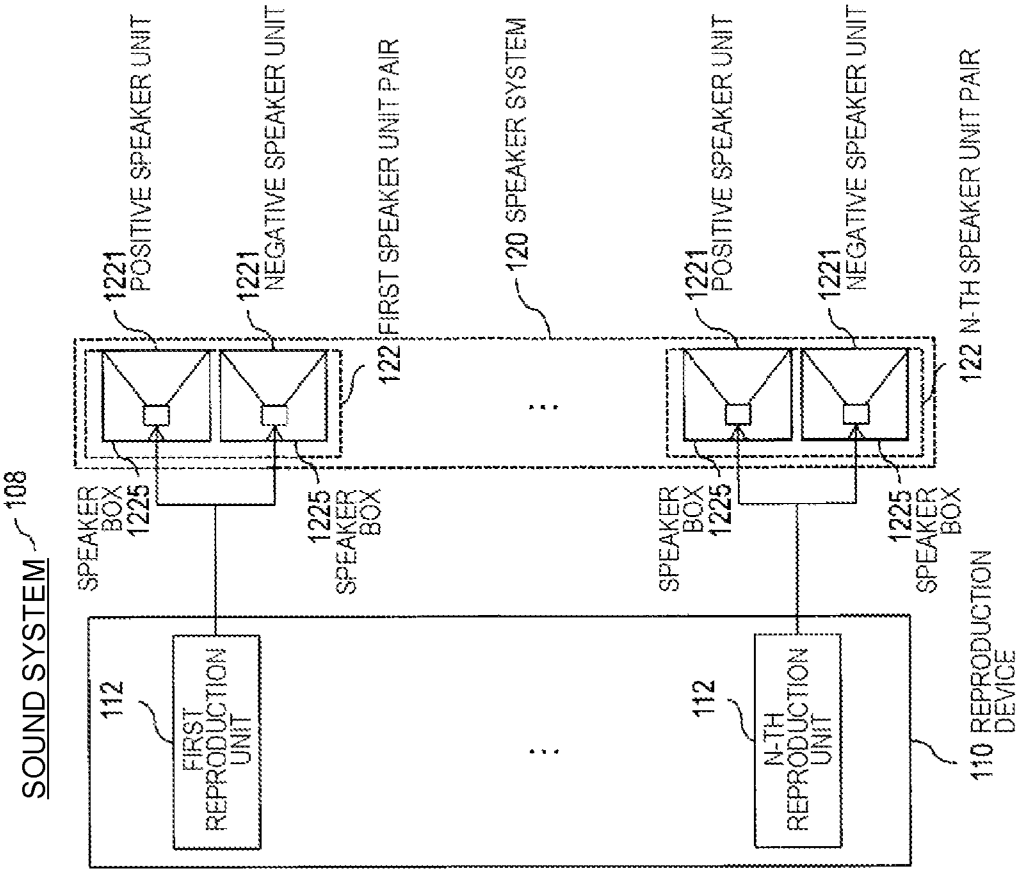
FIG. 19 is a block diagram illustrating an example of a configuration of a sound system 108.

Hereinafter, the sound system 108 will be described with reference to FIG. 19. FIG. 19 is a block diagram illustrating a configuration of the sound system 108. As illustrated in FIG. 19, similarly to the sound system 106, the sound system 108 includes the reproduction device 110 and the speaker system 120. The sound system 108 is different from the sound system 106 in that the speaker unit pair 122 including the speaker unit 1221 housed in a speaker box 1225 is included instead of the speaker unit pair 122 to which the member 1224 is attached.

Hereinafter, a structure of the n-th speaker unit pair 122 (n=1, . . . , N) will be described with reference to FIG. 19.

The positive speaker unit 1221 and the negative speaker unit 1221 of the n-th speaker unit pair 122 are respectively housed in speaker boxes 1225. Note that each speaker box 1225 has a large number of holes.

According to the embodiment of the present invention, it is possible to reduce noise that is heard at the time of seating in the seat of the aircraft. In addition, it is possible to reproduce a sound that can be heard only in a very limited narrow range that is the vicinity of the speaker system.

Fifth Embodiment

Differences from the second embodiment will be mainly described.

As described above, the sound system for noise reduction is a sound system for reducing noise around a user who uses a seat, and is a sound system that emits a cancellation sound so that noise cancellation by the cancellation sound for canceling noise arriving at the seat affects only a predetermined range near the user who uses the seat.

Since a high-frequency sound easily travels straight, it is difficult to be diffracted and the phases are difficult to be the same. For that reason, a high-frequency cancellation sound may not be silenced in the vicinity of the speaker unit or in a relatively distant place other than the vicinity as compared with a low-frequency cancellation sound.

To solve this problem, a sound system according to the present embodiment causes a high-frequency cancellation sound to arrive only in an area (user direction) from the silencing speaker unit to the ear with physical ingenuity, and absorbs the high-frequency cancellation sound in a direction other than that from the silencing speaker unit to the ear, with a sound absorbing material.

Figure 20:
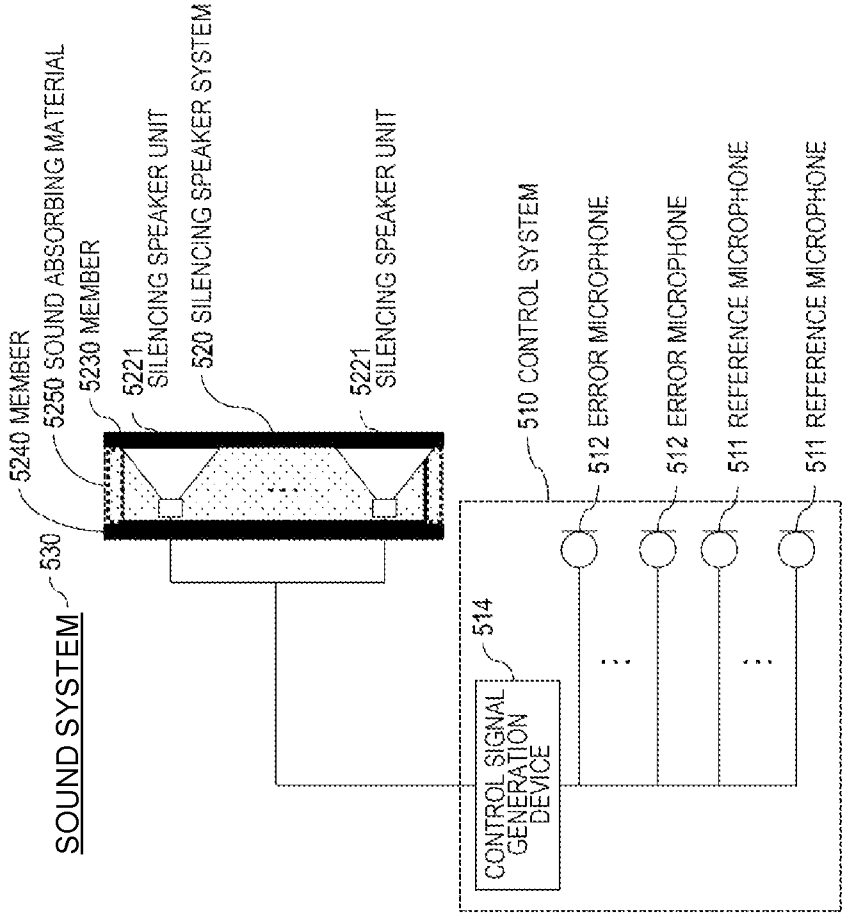
FIG. 20 is a block diagram illustrating an example of a configuration of a sound system 530.
Figure 21:
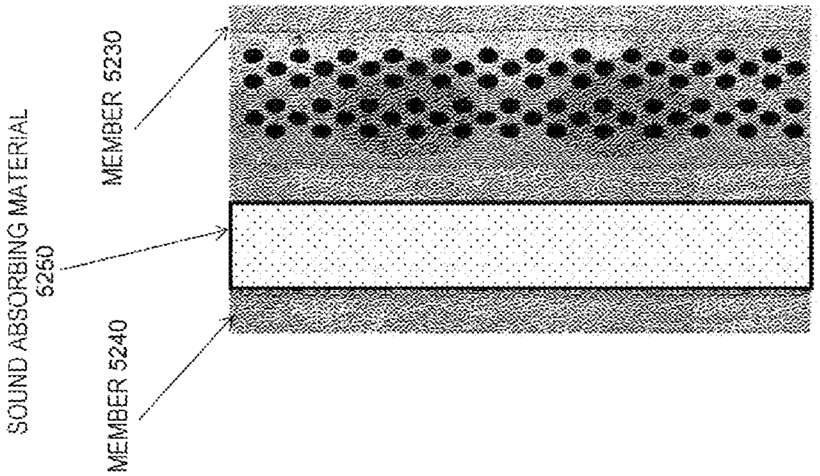
FIG. 21 is a diagram illustrating an example of a configuration of a silencing speaker unit to which members 5230 and 5240 and a sound absorbing material 5250 are attached.

Hereinafter, the sound system 530 will be described with reference to FIG. 20. FIG. 20 is a block diagram illustrating a configuration of the sound system 530. As illustrated in FIG. 20, similarly to the sound system 501, the sound system 530 includes a control system 510 and M silencing speaker systems 520. However, the sound system 530 is different from the sound system 501 in that an emission suppression unit is attached to each of the M silencing speaker units. The emission suppression unit includes at least a sound absorbing material 5250, and includes members 5230 and 5240 in the present embodiment (see FIGS. 20 and 21). The sound absorbing material 5250 includes a material, and has a shape and a structure, which easily absorb only sound having a frequency greater than or equal to a predetermined value. The emission suppression unit includes the sound absorbing material 5250, thereby being configured so that the sound (cancellation sound) having the frequency greater than or equal to the predetermined value emitted from the silencing speaker unit is hardly emitted to a place other than an ear of the user. Note that, as described in the first embodiment, the silencing speaker unit 5221 is arranged so that a sound emitted from the silencing speaker unit 5221 in the silencing user direction is silenced at a place other than the place close to the head of the user who uses the seat due to coming around of a sound emitted from the silencing speaker unit 5221 in a direction opposite to the silencing user direction. However, since the high-frequency sound easily travels straight, silencing by the coming around of the sound is difficult. Thus, in the present embodiment, a sound having a frequency that does not cause coming around (high-frequency sound) is absorbed by the sound absorbing material 5250. For that reason, the sound absorbing material 5250 only needs to be able to absorb the high-frequency sound that easily travels straight, and the predetermined value only needs to be set so that a sound having a frequency greater than or equal to the predetermined value does not cause the coming around.

The member 5230 and the member 5240 sandwich the M silencing speaker units 5221 respectively from the front and the back. Further, the member 5230 and the member 5240 sandwich the sound absorbing material 5250 at an edge of a surface sandwiching the M silencing speaker units 5221. In other words, the member 5230 and the member 5240 sandwich the sound absorbing material 5250 on a side surface of a space sandwiched between the member 5230 and the member 5240. The member 5230 and the member 5240 each may be a member such as a partition plate of the third embodiment. The member 5230 that sandwiches the M silencing speaker units 5221 from the front is provided with a hole so that sound passes through, and the member 5240 that sandwiches the M silencing speaker units 5221 from the back is not provided with a hole so that sound does not come out. The sound absorbing material 5250 is a member that has a higher sound absorbing effect at higher frequencies and in which sound is not absorbed at lower frequencies.

With such a configuration, the high-frequency cancellation sound having high straightness passes through the hole of the member 5230 and is emitted only to the ear. Since the sound absorbing material 5250 and the member 5240 prevent diffusion of the high-frequency cancellation sound, the high-frequency cancellation sound is not emitted to the side surfaces and the back of the M silencing speaker units 5221. On the other hand, since the low-frequency cancellation sound has high diffusibility, the low-frequency cancellation sound comes around to the back even if there is no hole in the member 5230. Regardless of whether or not there is a hole in the member 5230, low-frequency cancellation sounds pass through the sound absorbing material 5250, come around to the back, and cancel each other to be erased at a place other than the vicinity.

Operation of the control system 510 and the silencing speaker system 520 is similar to that of the second embodiment.

According to the embodiment of the present invention, it is possible to reduce noise that is heard at the time of seating in the seat of the aircraft.

Note that, in FIG. 20, the M silencing speaker units 5221 are covered with one emission suppression unit, but do not necessarily have to be covered with one emission suppression unit. For example, the M silencing speaker units 5221 may be respectively covered with M emission suppression units, or two each of the M silencing speaker units 5221 may be paired as a silencing speaker unit pair, and the silencing speaker unit pairs may be respectively covered with M/2 emission suppression units.

Experimental Result

A description will be given of an experimental result of the sound system for noise reduction according to the fifth embodiment. An automobile to which the sound system for noise reduction was applied was caused to travel, a dummy head was arranged in a passenger seat, two silencing speaker units were arranged to sandwich the dummy head from the left and right (see FIG. 3), a microphone was installed in an ear portion of the dummy head, and road noise was measured.

Figure 22:
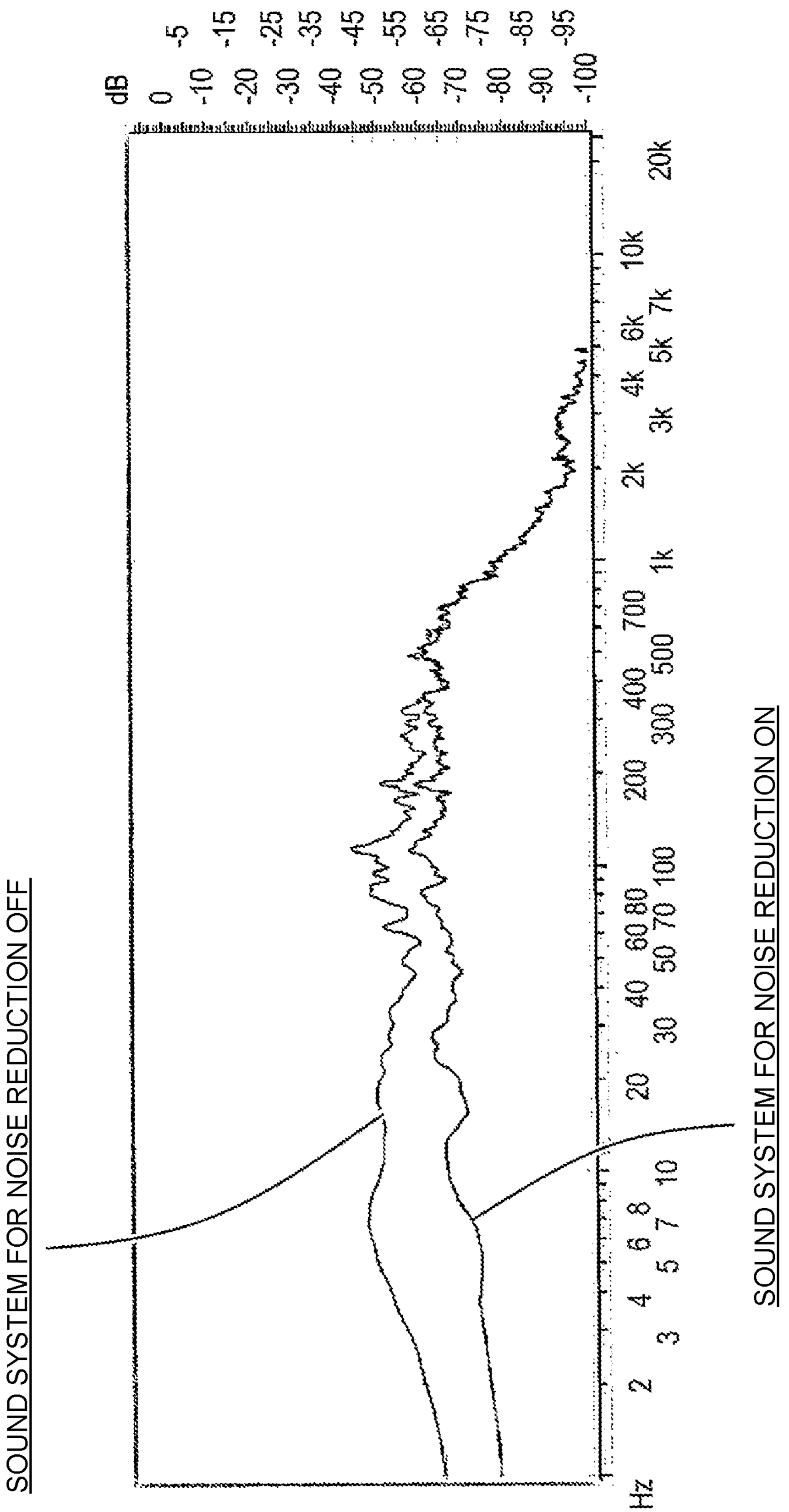
FIG. 22 is a diagram illustrating an experimental result of a fifth embodiment.
Figure 23:
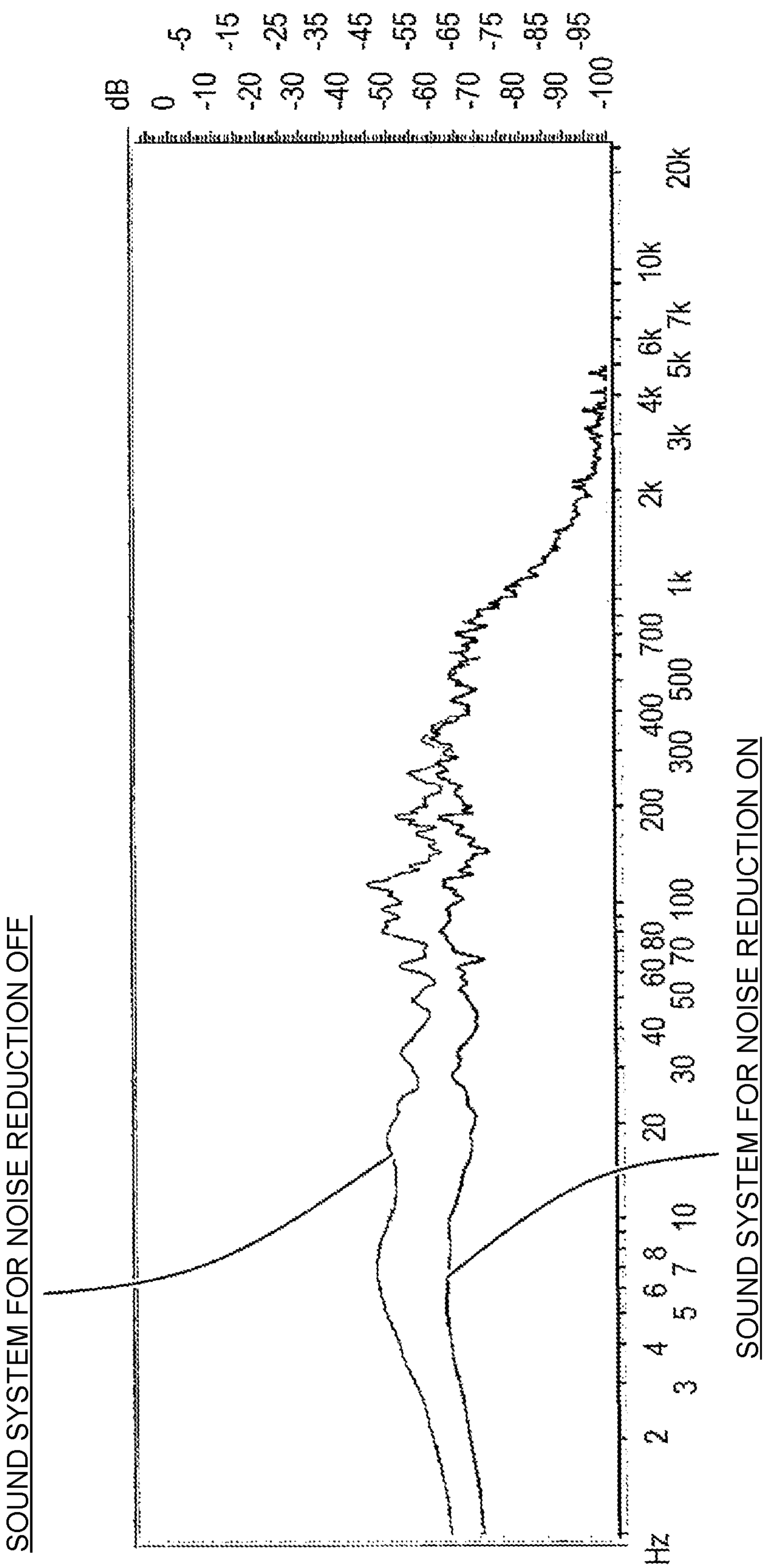
FIG. 23 is a diagram illustrating an experimental result of the fifth embodiment.

FIG. 22 illustrates road noise at a left ear position, and FIG. 23 illustrates road noise at a right ear position. By applying the sound system for noise reduction, silencing of the road noise of 7.78 dB at the left ear position, and silencing of the road noise of 7.87 dB at the right ear position has been achieved.

Supplement

The description of the embodiments of the present invention described above has been presented for purposes of illustration and description. There is no intention to be exhaustive or to limit the invention to the precise form disclosed. Modifications and variations are possible from the above teaching. The embodiments have been chosen and represented to provide the best illustration of the principles of the present invention, and to enable others skilled in the art to utilize the present invention in various embodiments and with added variations to suit contemplated practical use. All such modifications and variations are within the scope of the present invention as defined by the appended claims interpreted in accordance with a fairly and legally equitable breadth.

The invention claimed is:

1. A sound system comprising:

a control system that generates a control signal for erasing noise from a signal of the noise (hereinafter, the signal of the noise is referred to as a noise signal) in a place close to a head of a user who uses a seat;

a silencing speaker system that is installed at the place close to the head of the user who uses the seat and includes M speaker units each emitting a sound based on the control signal (hereinafter, the speaker units are referred to as silencing speaker units); and an emission suppression unit including at least a sound absorbing material that easily absorbs only a sound having a frequency greater than or equal to a predetermined value and configured to make it difficult for the sound having the frequency greater than or equal to the predetermined value emitted from the silencing speaker units to be emitted to a place other than an ear of the user, where M is an integer greater than or equal to 1, wherein the M silencing speaker units are defined as a first silencing speaker unit, . . . , and an M-th silencing speaker unit, a direction in which an m-th silencing speaker unit faces the user is defined as an m-th silencing user direction (m=1, . . . , M), and the m-th silencing speaker unit (m=1, . . . , M) is arranged such that an acoustic signal used for viewing and hearing by the user is enabled to be viewed and heard only at a place close to the head of the user and a sound emitted from the m-th silencing speaker unit in the m-th silencing user direction is silenced at a place other than a place close to the head of the user who uses the seat, due to coming around of a sound emitted from the m-th silencing speaker unit in a direction opposite to the m-th silencing user direction.

2. The sound system according to claim 1, further comprising a reproduction device including an n-th reproduction unit (n=1, . . . , N) that outputs a (2n−1)-th acoustic signal that is an acoustic signal obtained on a basis of a reproduction target and a 2n-th acoustic signal that is an acoustic signal having a phase opposite to that of the (2n−1)-th acoustic signal; and a speaker system that is installed at the place close to the head of the user who uses the seat and includes an n-th speaker unit pair (n=1, . . . , N) including a speaker unit that emits a sound based on the (2n−1)-th acoustic signal and a speaker unit that emits a sound based on the 2n-th acoustic signal, where N is an integer greater than or equal to 1.

3. The sound system according to claim 1, wherein the predetermined value is set such that a sound having a frequency greater than or equal to the predetermined value does not cause the coming around.

4. The sound system according to claim 1, wherein the m-th silencing speaker unit is sandwiched between two members in the m-th silencing user direction and a direction opposite to the m-th silencing user direction, and the two members sandwich the sound absorbing material on a side surface of a space sandwiched between the two members, and one of the members in the m-th silencing user direction is provided with a hole such that sound passes through, and one of the members in the direction opposite to the m-th silencing user direction is not provided with a hole such that sound does not come out.

* * * * *